United States Patent [19]

Murai

[11] Patent Number: 5,787,112
[45] Date of Patent: Jul. 28, 1998

[54] DATA DEMODULATION CIRCUIT AND METHOD FOR SPREAD SPECTRUM COMMUNICATION

[75] Inventor: Hideshi Murai, Kamakura, Japan

[73] Assignee: Mitsubishi Denki Kabushiki Kaisha, Tokyo, Japan

[21] Appl. No.: 385,284

[22] Filed: Feb. 8, 1995

[30] Foreign Application Priority Data

Mar. 9, 1994 [JP] Japan ................... 6-038702

[51] Int. Cl.$^6$ ................................. H04B 1/707
[52] U.S. Cl. .................. 375/206; 375/367; 375/208
[58] Field of Search ........................ 375/200, 206, 375/208, 209, 210, 367; 380/46

[56] References Cited

U.S. PATENT DOCUMENTS

| | | |
|---|---|---|
| 4,901,307 | 2/1990 | Gilhousen et al. . |
| 5,103,459 | 4/1992 | Gilhousen et al. . |
| 5,241,561 | 8/1993 | Barnard ................... 375/206 |
| 5,276,705 | 1/1994 | Higgins ................... 375/206 |
| 5,305,347 | 4/1994 | Roschmann et al. ............ 375/210 |
| 5,383,220 | 1/1995 | Murai ................... 375/206 |

OTHER PUBLICATIONS

K. Takahashi, M. Takeishi, H. Ohnishi "A Study On Frequency Off-Set Compensation for DS/QPSK" Electronic Info Communication Soc.

Primary Examiner—Don N. Vo
Attorney, Agent, or Firm—Wolf, Greenfield & Sacks, P.C.

[57] ABSTRACT

A data demodulator circuit for spread spectrum communication, presenting improved demodulation characteristics by allowing the elimination of the influence of a carrier offset remaining after down converting, and the removal of the interference caused by pilot signals with different timing. In-phase axis receive signal and operate with their respective reception timing of pilots signal. Phase difference information is extracted from the input signals and the signals are delayed to insure that the extracted phase difference information is equivalent to the average phase revolution. The influence of the carrier offset is eliminated by use of the extracted phase difference information. A data demodulator with canceler removes an interference $I_{DF}$ of pilot signals with different timing originating from the outputs of an interference amount calculator.

22 Claims, 34 Drawing Sheets

DATA DEMODULATION CIRCUIT AND METHOD FOR SPREAD SPECTRUM COMMUNICATION

BACKGROUND OF THE INVENTION

1. Field of the Invention

The present invention relates generally to a data demodulation circuit and method for spread spectrum communication and, more particularly, to a data demodulation circuit and method capable of eliminating the influence of a carrier offset remaining after detection by use of pilot signals whose data are unmodulated transmitted from a cell-site. The present invention is also directed to a data demodulation circuit and method designed to remove the interference caused by pilot signals of different timings, and further to a data demodulation circuit and method allowing a diversity reception through a plurality of such data demodulation circuits and methods.

2. Description of the Related Arts

Direct sequence (DS) spread spectrum communication systems (hereinafter referred to as SS system) has various advantages such as immunity to interference and frequency selective fading, multiple accessibility, and hence is being developed as one of the communication systems for mobile communications including mobile phones, cellular phones, cordless phones and wireless LANs. In the following description, a term "symbol" will represent one of the information alphabets to be decided by the data modulation scheme. In the case of BPSK (binary shift keying) modulation, the symbol can be considered to be data.

FIG. 31 depicts a schematic configuration of a mobile unit telephone of CDMA (code division multiple access) cellular telephone system disclosed in U.S. Pat. No. 5,103,459. This mobile CDMD telephone system includes an antenna 1 being connected via a diplexer 2 to an analog receiver 3 and a power amplifier 4. The antenna 1 receives SS (spread spectrum) signals from a cell-site to provide received signals to the analog receiver 3 through the diplexer 2. The analog receiver 3 includes a down converter that converts the input received signals to baseband signals which are in turn converted to digital signals by an A/D (analog to digital) converter. Thus digitized baseband signals are fed to a searcher receiver 5 and digital data receivers (or data demodulator circuits) 6 and 7.

When the SS signals arrive at the receiver via a plurality of paths, there will arise timing differences for each signal of respective paths. The data demodulator circuits 6 and 7 are able to select which path signal is to be tracked and received. In the presence of two data demodulator circuits as shown in FIG. 31, the two separate paths are tracked in parallel.

On the contrary, in response to a control signal from a control processor 8, the searcher receiver 5 scans a time domain in the vicinity of the reference timing of a received pilot signal, so as to detect respective pilot signals contained in the received multipath signals (signals received by way of a plurality of paths) from the cell-site. Then, the searcher receiver 5 compares the strength of the received pilot signals, and outputs an strength signal to the control processor 8 to indicate the strongest signals.

Then, the control processor 8 provides control signals to the data demodulator circuits 6 and 7 for respective processing of one of the different strongest signals.

The function of the data demodulator circuits 6 and 7 is to correlate the received signals with the PN (pseudo noise) codes used in the transmitter side. FIG. 32 depicts the detail of a data demodulator circuit disclosed in the U.S. Pat. No. 5,103,459. The data demodulator circuits 6 and 7 include PN generators 516 and 518 which generate PN codes $PN_I(t)$ and $PN_Q(t)$ for the in-phase axis and the quadrature axis respectively, corresponding to one of the received path signals. The data demodulator circuits 6 and 7 each further include a Walsh function generator 520 for generating a Walsh function appropriate for the cell-site to communicate with this mobile unit. The Walsh function generator 520 generates a code sequence corresponding to Walsh function allocated in response to the select signal from the control processor. As a part of a call set-up message, the select signal are transmitted from a cell-site to the mobile unit. PN codes $PN_I(t)$ and $PN_Q(t)$ output from the PN generators 516 and 518, respectively, are provided as inputs to EX-OR gates 522 and 524, respectively. The Walsh function generator 520 provides its output to the EX-OR gates 522 and 524 which calculate EX-OR to generate sequences $PN_I(t)$ and $PN_Q(t)$.

The sequences $PN_I(t)$ and $PN_Q(t)$ are input to PN QPSK (quadrature phase shift keying) correlator 526 for processing, and outputs of correlator 526, I and Q, are led into corresponding accumulators 528 and 530. As a result, respective correlations with respect to the in-phase axis received signals and the quadrature axis received signals are calculated by the cooperation of the PN QPSK correlator 526 and the respective accumulators. The outputs of the accumulators are provided to a phase rotator 532. The phase rotator 532 also receives the phase of a pilot signal from the control processor 8. The phase of a received symbol is rotated in response to the phase of the pilot signal. The phase of the pilot signal is decided by the searcher receiver and the control processor. The output of the phase rotator 532 is in-phase axis data 23 to be fed into a combiner-decoder circuit 9.

The combiner-decoder circuit 9 consists of a diversity combiner circuit and an FEC decoder circuit.

The diversity combiner circuit adjusts the timing of two received symbols into alignment, multiplies the two symbols by values corresponding to their respective relative signal strength, and simultaneously adds them together. This operation results in a maximal ratio combining diversity reception. Reference is to be made to PCT/US90/06417 disclosing a form of the diversity reception in the CDMA cellular system.

As described hereinbefore, the conventional receiver has a configuration in which all the path signals are processed in common by the single analog receiver acting to down convert the received signals to base band digital signals. It is to be noted that the each received path signals has independent carrier phases respectively. For a single path signal, for example, COHERENT SPREAD SPECTRUM SYSTEMS, by J. K. Holmes, John Wiley & Son discloses a manner of controlling the phase of the received signal in the analog receiver 3 with the aid of a carrier recovery circuit such as a Costas loop. However, in the case of a plurality path signals, it is difficult to simultaneously control the different phases of a plurality of received path signals. Therefore, any input signals to the data demodulators will inevitably contain a phase difference (or a residual phase difference after down converting) between a received path carrier and a local carrier used for down converting.

More specifically, where the modulation by the data and by the Walsh function for user identification are both BPSK (biphase shift keying) and the modulation for spreading is QPSK (quadrature phase shift keying), in the same manner as the modulation disclosed in the U.S. Pat. No. 5,103,459, then a complex envelope of transmission signal S(t) can be given as $$\begin{aligned} S(t) &= W(t)[PN_I(t) + jPN_Q(t)] \\ &= W(t)PN_I + jW(t)PN_Q(t) \\ &= S_I(t) + jS_Q(t), \end{aligned}$$

where W(t) is a multiplexing signal being multiplexed of SS signals transmitting to each user and a pilot signal, and let $d_i(t)$, $W_i(t)$ and $\alpha_i$ be modulation data, a Walsh function, and a constant corresponding to power allocation, to i-th user, respectively, and N be a number of multiplexing, then W(t) is $$W(t) = \Sigma \alpha_i d_i(t) W_i(t)$$

($\Sigma$ represents the sum of i=0 to N, and i=0 corresponds to a pilot signal)

Next, let $\rho$ be a received amplitude of a received path signal; and $\theta$ be a phase difference (or a phase difference after down converting) between a received path signal carrier and local carrier used in down converting, then the complex envelope RX(t) of one of the received path signal to be demodulated at the output of the analog receiver can be expressed as $$\begin{aligned} RX(t) &= \rho S(t) \exp[j\theta] \\ &= \rho W(t)[PN_I(t) + jPN_Q(t)] * \\ & \quad [\cos\theta + j\sin\theta] \\ &= \rho W(t)[\{PN_I(t)\cos\theta - PN_Q(t)\sin\theta\} + \\ & \quad j\{PN_Q(t)\cos\theta + PN_I(t)\sin\theta\}] \\ &= RX_I(t) + jRX_Q(t) \end{aligned}$$

Namely, the in-phase axis received signal $RX_I(t)$ is a real part of RX(t), resulting in $$RX_I(t) = \rho W(t)\{PN_I(t) \cos\theta - PN_Q(t) \sin\theta\}$$

and the quadrature axis received signal is an imaginary part of RX(t), resulting in $$RX_Q(t) = \rho W(t)\{PN_Q(t) \cos\theta + PN_I(t) \sin\theta\}$$

These in-phase axis received signal and quadrature axis received signal are provided as input to the PN QPSK correlator.

In FIG. 32 the phase rotator 532 is used to eliminate the influence of a phase difference. Although the U.S. Pat. No. 5,103,459 does not disclose in detail a way of deciding a pilot signal phase as the reference phase of the phase rotator, the searcher receiver also includes a PN QPSK correlator and accumulators associated with the pilot signal, whereby that phase is supposedly determined through the execution of an arithmetic $\tan^{-1}(\sin \theta/\cos \theta)$. Further, the phase rotation operation may be considered as a product operation of the phase compensation term $\exp(-j\theta) = \cos\theta - j\sin\theta$. Such phase rotation operation will adversely result in a complicated processing in which it is necessary to execute $\tan^{-1}$ arithmetic for finding $\theta$ and to again find $\cos\theta$ and $\sin\theta$ from thus obtained $\theta$.

Further, owing to the scanning of a plurality of received paths, the searcher receiver entailed a problem that the reference phase is sensitive to the influence of noise since the averaging time for reducing the influence of noise is shortened in proportion to time period to be scanned, as compared with the case where the phase is determined by a single path signal. (In other words, as the noise is random, a longer averaging time will reduce the influence of noise, noise influence reducing effect will not be expected sufficiently with a shorter averaging time). Disadvantageously, a longer averaging time for ensuring a sufficient reduction of noise effect would elongate the time required to obtain the results of scanning over the entire time domains, resulting that a true phase difference may not be found due to a variation of link condition depending on the movement of the mobile during the elongated time.

While on the contrary, Japanese Patent Application No. 149369/93 discloses a data demodulator circuit in which a pilot signal, contained in a specific received path signal demodulated by the data demodulator circuit, is subjected to a correlating process to extract phase difference information for compensating the influence of a phase difference. FIG. 33 depicts a phase difference information extracting section and a phase compensating section constituting the data demodulator circuit disclosed in the Japanese Patent Application No. 149369/93. In FIG. 33, reference numerals 20a, 20b, 20c and 20d denote averaging sections each acting to perform a time averaging operation with respect to input signals. These sections subject in-phase axis received signal and quadrature axis received signal to processing depicted in the diagram to thereby provide, as averaging section outputs, components $\rho\alpha_0 \cos\theta$ or $\rho\alpha_0 \sin\theta$ associated with a phase difference.

$\alpha_0$ represents a constant related to a power allocation of the pilot signal. It is to be appreciated that time averaging operations exceeding one symbol time performed by the averaging sections ensure a sufficiently suppressed influence of the crosscorrelation between $PN_I$ and $PN_Q$ contained in the outputs of multipliers 11, 12, 13 and 14.

Since a received signal in the presence of a phase difference is defined as $RX(t)=\rho S(t) \exp[j\theta]$ as described earlier, the influence of the phase difference can be cleared by multiplying RX(t) by a phase compensation term $\exp[-j\theta]$, which yields $$\begin{aligned} \rho S(t) \exp[j\theta] \exp[-j\theta] &= \rho S(t) \\ &= \rho S_I(t) + j\rho S_Q(t). \end{aligned}$$

Here, if the received signal is separated into an in-phase axis received signal and a quadrature axis received signal previous to the multiplication of the phase compensation term, the above expression can be written as $$\rho S(t)\exp[j\theta]\exp[-j\theta] = [RX_I(t) + jRX_Q(t)] * \exp[-j\theta] =$$

$$[RX_I(t) + jRX_Q(t)] * [\cos\theta - j\sin\theta] = [RX_I(t)\cos\theta + RX_Q(t)\sin\theta] +$$

$$j[RX_Q(t)\cos\theta - RX_I(t)\sin\theta]$$

Namely, taking notice of the right side of the above expression, a first term is in the form of the sum of a term obtained by multiplying the in-phase axis received signal by $\cos\theta$ and a term obtained by multiplying the quadrature axis received signal by $\sin\theta$, whereas a second term is comprised of the sum of a product of the in-phase axis received signal and $-\sin\theta$ and a product of the quadrature axis received signal and $\cos\theta$. On the other hand, the outputs of the averaging sections mean 20a, 20b, 20c and 20d are respectively $\rho\alpha_0 \cos\theta$, $-\rho\alpha_0 \sin\theta$, $\rho\alpha_0 \sin\theta$ and $\rho\alpha_0 \cos\theta$. Accordingly, without the coefficient $\rho\alpha_0$ signal processing equivalent to the above expression will be implemented by multiplying the outputs of the averaging sections mean 20a, 20b, 20c and 20d, and $RX_I$ and $RX_X$ together in such a combination as depicted in FIG. 33 and then taking addition or subtraction on the products.

In FIG. 33, two components on cos θ are respectively derived from the averaging sections mean 20a and 20d, and two components on sin θ are respectively derived from the averaging sections mean 20b and 20c. FIG. 34 depicts a phase compensating section of the data demodulator circuit also disclosed in the Japanese Patent Application 149369/93. Aiming at simplifying the circuitry, the phase compensating section is provided with a single multiplier and a single averaging section intended to extract in cooperation the components on cos θ and sin θ.

In this manner, FIG. 32 configuration inconveniently necessitated such complicated processing as $\tan^{-1}$ arithmetic and phase rotation operation, or the reference phase was sensitive to the noise effect due to the use of a pilot phase presented by the searcher receiver scanning a plurality of received pilot signals. The circuit of FIG. 33 still remained redundant structure regardless of its intention to overcome these problems. Although the configuration depicted in FIG. 34 contrives to remove the redundancy of the FIG. 33 configuration, it has left unsolved the problem of being sensitive to the influence of the noise, due to its use of only half of the components associated with the phase difference information contained in the received signals.

Also, the use of a plurality of data demodulator circuits for diversity reception may bring about a problem that the complexity of the receiver as a whole is increased accordingly as the configurations and processing of individual data demodulator circuits become more complicated.

Moreover, increased influence of the noise of the phase compensation means constituting the data demodulator circuit will cause a deterioration in the demodulation characteristics of the data demodulator circuit. Thus, there arises a problem of improving the demodulation characteristics of the individual data demodulator circuits to ensure further improved demodulation characteristics in the diversity reception.

Furthermore, in order to get the maximum performance of the maximal ratio combining diversity reception, it is necessary for the phases of the outputs of respective data demodulator circuits to adjust the phases accurately and weighted by values in response to the signal strength. However, the use of a pilot signal phase and a pilot signal level obtained by the searcher receiver would be difficult to get the maximum performance of the diversity reception due to larger influence of noise. "To adjust the phases" means herein that the phase compensation is carried out accurately.

Also, there may be a frequency deviation generally between a transmission carrier frequency for use in a cell-site transmitter and a local oscillator output frequency used in down converting within the mobile.

The above-described phase difference θ remaining after down converting can be considered to have no time variation, while if there is the frequency deviation between the received path signal carrier and the local oscillator output used in down converting, it can be expressed as $$\phi = \delta\omega t + \theta$$

where $\delta = 2\pi\delta f$, and δf is a frequency deviation. Hereinafter, φ represented in the above expression will be referred to as a carrier offset.

Due to the random behavior of the noise, an elongated averaging time in the averaging sections would reduce the influence of the noise but adversely prevent the compensation of carrier offset (frequency and phase compensation) owing to the time variation for δω. A shorter time T would result in less influence of δω but also in a shortened averaging time which will in turn suppress the noise reduction effect by averaging. Thus, the conventional phase compensation means allows the problem of increased influence of noise to remain unsolved.

Besides, as the phase compensation means of the data demodulator circuit is increasingly influenced by the noise, the demodulation characteristics of the data demodulator circuit will be degraded. Thus, there remains the problem of improving the demodulation characteristics of individual data demodulator circuit to get the further improvement of the demodulation characteristics of the diversity reception. Also there remains the problem of adjusting the phase of the outputs of the respective data demodulator circuits to get the sufficient performance of the diversity reception.

A means of compensating the carrier offset has been, for example, reported by Takahashi, Takeishi and Onishi (IEICE, Spring National Conference A-204, 1993) (although its modulation method differs from that of the U.S. Pat. No. 5,103,459). To obtain a fixed phase difference, this method comprises the steps of performing a $\tan_{-1}$ arithmetic for each despreading symbol to find a phase for each symbol and the differences between the successive phases, averaging the differences to find the amount of phase rotation corresponding to the frequency offset, and subtracting therefrom the amount of phase rotation corresponding to the phase found for each symbol, in order to finally average the results.

Namely, let φ (n) be a phase derived from an n-th despreading symbol, T be a symbol duration, N be an averaging number, and $\delta\phi = \delta\omega T$, then δφ and θ are obtained by an operation $$\phi(n) = \tan^{-1}[\sin\{\phi(n)\}/\cos\{\phi(n)\}]$$

$$\delta\phi = (1/N)\Sigma[\phi(n+1) - \phi(n)]$$

$$\theta = (1/N)\Sigma[\phi(n) - n\delta\phi]$$

where Σ represents the sum of N=1 to N. Then, the despreading symbols (which correspond to the outputs of the accumulators 528 and 530 in FIG. 32) are multiplied by exp(−jφ). Nevertheless, it will be necessary to operate $\tan_{-1}$ and phase rotation, resulting in complicated processing.

Also, in the case of a diversity reception using a plurality of data demodulator circuits, complicated processing required for the individual data demodulator circuit will inconveniently bring about a further increased complexity in the receiver as a whole.

Besides, the use of the communication system disclosed in the U.S. Pat. No. 5,103,459 will allow a problem that the received multipath signals cause mutual interferences to degrade the receiving characteristics. More specifically, when signals transmitted from the cell-site are received through a plurality of paths, there will arise differences in the timing of the reception of the respective path signals. S(t) being orthogonal multiplexed signals based on a Walsh function, the orthogonality of the orthogonal multiplexed signals is permitted to be established only when respective receive timings coincide, whereas if the receive timings are individually different, they will become interference components to degrade the demodulation characteristics. Accordingly, there remains a problem of improving the degradation in the demodulation characteristics of the data demodulator circuit by the interference components.

There also remains the problem of reducing the degradation in the demodulation characteristics of the individual data demodulator circuit by the interference components to further improve the demodulation characteristics of the diversity reception.

SUMMARY OF THE INVENTION

The present invention was conceived in view of the problems involved in the prior art described above.

It is therefore one object of the present invention to provide a data demodulator circuit for spread spectrum communication having a simpler configuration capable of eliminating a carrier offset remaining after down converting to thereby improve its demodulation characteristics.

Another object of the present invention is to provide a data demodulator circuit for spread spectrum communication ensuring improved demodulation characteristics by removing the interference caused by pilot signals with different timing.

Still another object of the present invention is to provide a data demodulator circuit for spread spectrum communication having a simple configuration capable of a diversity reception with the aid of a plurality of the data demodulation circuits to thereby further improve its demodulation characteristics.

According to a first aspect of the present invention, in order to accomplish the above object, a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a phase difference information extraction means for extracting information of phase differences, by multiplying in-phase axis received signal and quadrature axis received signal with respective pseudo noise codes used on the transmitter side, taking addition or subtraction on two of the products in a predetermined combination, and averaging the results of the addition or subtraction a phase compensation means for compensating the effect of phase differences remaining in the in-phase axis received signal and the quadrature axis received signal, by use of the phase difference information obtained by said phase difference information extraction means; and a data demodulation means for demodulating transmitted data from the outputs of said phase compensation means.

According to a second aspect of the present invention, in order to accomplish the above object, a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a plurality of data demodulator circuits with independent timing for spread spectrum communication according to claim 1; a timing adjustment means adjusting the timing of the outputs of a plurality of said data demodulator circuits; an adder means for adding the outputs of said timing adjustment means; and a data decision means for deciding the transmitted data from the output of said adder means.

According to a third aspect of the present invention, in order to achieve the above object, a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition or subtraction; a delay means for delaying the in-phase axis received signal and the quadrature axis received signal for a suitable period of time; a frequency and phase compensation means for compensating the effect of frequency and phase offset remaining in the in-phase axis received signal and the quadrature axis received signal with time delayed by said delay means, by use of the phase difference information obtained by said phase difference information extraction means; and a data demodulation means for demodulating transmitted data from the outputs of said frequency and phase compensation means.

According to a fourth aspect of the present invention, in order to attain the above object, a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a plurality of data demodulator circuits with independent timing for spread spectrum communication according to claim 3; a timing adjustment means adjusting the timing of the outputs of a plurality of said data demodulator circuits; an adder means for adding the outputs of said timing adjustment means; and a data decision means for deciding the transmitted data from the output of said adder means.

According to a fifth aspect of the present invention, provided in order to accomplish the above object, a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a phase difference information extraction means for extracting information of phase differences, by multiplying in-phase axis received signal and quadrature axis received signal by respective pseudo noise codes used on the transmitter side, taking addition or subtract on two of the products in a predetermined combination, and averaging the results of the ddition or subtraction; a delay means for delaying the in-phase axis received signal and the quadrature axis received signal for a suitable period of time; a level control means for controlling the levels of the phase difference information obtained by said phase difference information extraction means; a frequency and phase compensation means for compensating the effect of frequency and phase offset remaining in said time delayed in-phase axis received signal and quadrature axis received signal, by use of the phase difference information whose level has been controlled by said level control means; and a data demodulation means for demodulating transmitted data from the outputs of said frequency and phase compensation means.

According to a sixth aspect of the present invention, provided in order to accomplish the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a plurality of data demodulator circuits with independent timing for spread spectrum communication; a timing adjustment means adjusting the timing of the outputs of a plurality of said data demodulator circuits; a level adjustment means for adjusting the levels of said outputs of said plurality of data demodulator circuits with timing adjusted by said timing adjustment means; an adder means for adding the outputs of said level adjustment means; and a data decision means for deciding the transmitted data from output of said adder means.

According to a seventh aspect of the present invention, provided in order to attain the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition or subtraction; a delay means for delaying the in-phase axis received signal and the quadrature axis received signal for a suitable period of time; a frequency and phase compensation means for compensating the effect of frequency and phase offset remaining in said time delayed the in-phase axis received signal and the quadrature axis received signal with time delayed by said delay means, by use of the phase difference information obtained by said phase difference information extraction means; an interference amount calculation means for calculating the amounts of interference effecting on the outputs of said frequency and phase compensation means due to pilot signals with different timing; and a data demodulation means with canceler for demodulating transmitted data from the outputs of said frequency and phase compensation means, while subtracting the interference amounts calculated by said interference amount calculation means.

According to a eighth aspect of the present invention, provided in order to attain the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a plurality of data demodulator circuits with independent timing for spread spectrum communication; a timing adjustment means adjusting the timing of the outputs of a plurality of said data demodulator circuits; an adder means for adding the outputs of said timing adjustment means; and a data decision means for deciding the transmitted data from the output of said adder means.

According to a ninth aspect of the present invention, provided in order to attain the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition or subtraction; a delay means for delaying the in-phase axis received signal and the quadrature axis received signal for suitable period of time; a frequency and phase compensation means for compensating the effect of frequency and phase offset remaining in the in-phase axis received signal and the quadrature axis received signal with time delayed by said delay means, by use of the phase difference information obtained by said phase difference information extraction means; a level detection means for detecting the levels of the phase difference information extracted by said phase difference information extraction means; a selective interference amount calculation means for calculating the amounts of interference effecting on the outputs of said frequency and phase compensation means due to pilot signals with different timing, controlling the results of said calculation in response to the levels detected by said level detection means, and selectively outputting the amounts of interference according to the results of said control; and a data demodulation means with canceler for demodulating transmitted data from the outputs of said frequency and phase compensation means, while subtracting the interference amounts calculated by said selective interference amount calculation means.

According to a tenth aspect of the present invention, provided in order to attain the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a plurality of data demodulator circuits with independent timing for spread spectrum communication; a timing adjustment means adjusting the timing of the outputs of a plurality of said data demodulator circuits; an adder means for adding the outputs of said timing adjustment means; and a data decision means for deciding the transmitted data from the output of said adder means.

According to a eleventh aspect of the present invention, provided in order to attain the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition and subtract; a delay means for delaying the in-phase axis received signal and the quadrature axis received signal for suitable period of time; a level control means for controlling the levels of the phase difference information obtained by said phase difference information extraction means; a frequency and phase compensation means for compensating the effect of frequency and phase offset remaining in the in-phase axis received signal and the quadrature axis received signal with time delayed by said delay means, by use of the phase difference information obtained by said phase difference information extraction means; an interference amount calculation means for calculating the amount of interference effecting on said level controlled outputs of said frequency and phase compensation means due to pilot signals with different timing due to signals with different timing; and a data demodulation means with canceler for demodulating transmitted data from the outputs of said frequency and phase compensation means, while subtracting the interference amounts calculated by said interference amount calculation means.

According to a twelfth aspect of the present invention, provided in order to attain the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a plurality of data demodulator circuits with independent timing for spread spectrum communication; a timing adjustment means adjusting the timing of the outputs of a plurality of said data demodulator circuits; a level adjustment means for adjusting the levels of said outputs of said plurality of data demodulator circuits with timing adjusted by said timing adjustment means; an adder means for adding the outputs of said level adjustment means; and a data decision means for deciding the transmitted data by the output of said adder means.

According to a thirteenth aspect of the present invention, provided in order to attain the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition or subtraction; a delay means for delaying the in-phase axis received signal and the quadrature axis received signal for suitable period of time; a level control means for controlling the levels of the phase difference information obtained by said phase difference information extraction means; a frequency and phase compensation means for compensating the effect of frequency and phase offset remaining in the in-phase axis received signal and the quadrature axis received signal with time delayed by said delay means, by use of the phase difference information obtained by said phase difference information extraction means; a selective interference amount calculation means for calculating the amounts of interference effecting on the outputs of said frequency and phase compensation means due to pilot signals with different timing, controlling the results of said calculation in response to the levels detected through a controlled variable calculation process by said level detection means, and selectively outputting the amounts of interference in compliance with the results of said control; and a data demodulation means with canceler for demodulating transmitted data from the outputs of said selective frequency and phase compensation means, while subtracting the interference amounts calculated by said interference amount calculation means.

According to a fourteenth aspect of the present invention, provided in order to attain the above object is a data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprises a plurality of data demodulator circuits with independent timing for spread spectrum communication; a timing adjustment means adjusting the timing of the outputs of a plurality of said data demodulator circuits; a level adjustment means for adjusting the levels of said outputs of said plurality of data demodulator circuits with timing adjusted by said timing adjustment means; an adder means for adding the outputs of said level adjustment means; and a data decision means for deciding the transmitted data from the output of said adder means.

According to a fifteenth aspect of the present invention, provided in order to attain the above object is a method for data demodulation in a demodulation apparatus for spread spectrum communication which demodulates data from received signal which is spread spectrum modulated with respect to the in-phase axis and the quadrature axis by a direct sequence technique with an in-phase axis pseudo noise code and a quadrature axis pseudo noise code, respectively, said method comprises the steps of multiplying in-phase axis received signal and quadrature axis received signal with respective pseudo noise codes used on the transmitter side; taking addition or subtraction on two of the products in predetermined combination; extracting information of phase differences by averaging the results of the addition or subtraction; and compensating the effect of phase differences remaining in the in-phase axis received signal and the quadrature axis received signal by use of the phase difference information.

According to a sixteenth aspect of the present invention, provided in order to attain the above object is the method of data demodulation, further comprising before the compensating step, the step of: delaying the in-phase axis received signal and the quadrature axis received signal for a suitable period of time; and wherein the compensating step compensates the effect of frequency and phase offset remaining in the in-phase axis received signal and the quadrature axis received signal with time delayed by the quadrature axis received signal with time delayed by the delaying step, by use of the phase difference information.

According to a seventeenth aspect of the present invention, provided in order to attain the above object is the method of data demodulation, further comprising before the compensating step, the step of: controlling the levels of the phase difference information.

According to a eighteenth aspect of the present invention, provided in order to attain the above object is the methods of data demodulation, further comprising the steps of: calculating the amounts of interference effecting on the frequency and phase compensation due to pilot signals with different timing; and demodulating transmitted data by subtracting the interference amounts.

According to a nineteenth aspect of the present invention, provided in order to attain the above object is the method of data demodulation, further comprising before the calculating step, the step of: detecting the levels of the phase difference information; selecting the amounts of interference according to the levels of the phase difference information.

According to a twelfth aspect of the present invention, provided in order to attain the above object is the method of data demodulation, further comprising before the compensating step, the step of: controlling the levels of the phase difference information.

According to a twenty-first aspect of the present invention, provided in order to attain the above object is the method of data demodulation, further comprising before the demodulating step, the step of: selecting the amounts of interference according to the levels of the phase difference information.

According to a twenty-second aspect of the present invention, provided in order to attain the above object is the method of data demodulation, further comprising the steps of: adjusting the timing of outputs of a plurality of the demodulation apparatus; adding the outputs of a plurality of the demodulation apparatus; and deciding the transmitted data.

BRIEF DESCRIPTION OF THE DRAWINGS

These and other objects and advantages of the present invention will become more apparent, when viewed in conjunction with the following drawings, in which.

DESCRIPTION OF THE PREFERRED EMBODIMENTS

Exemplary embodiments of a data demodulator circuit for spread spectrum communication in accordance with the present invention will now be described with reference to the accompanying drawings.

Embodiment 1

Figure 1:
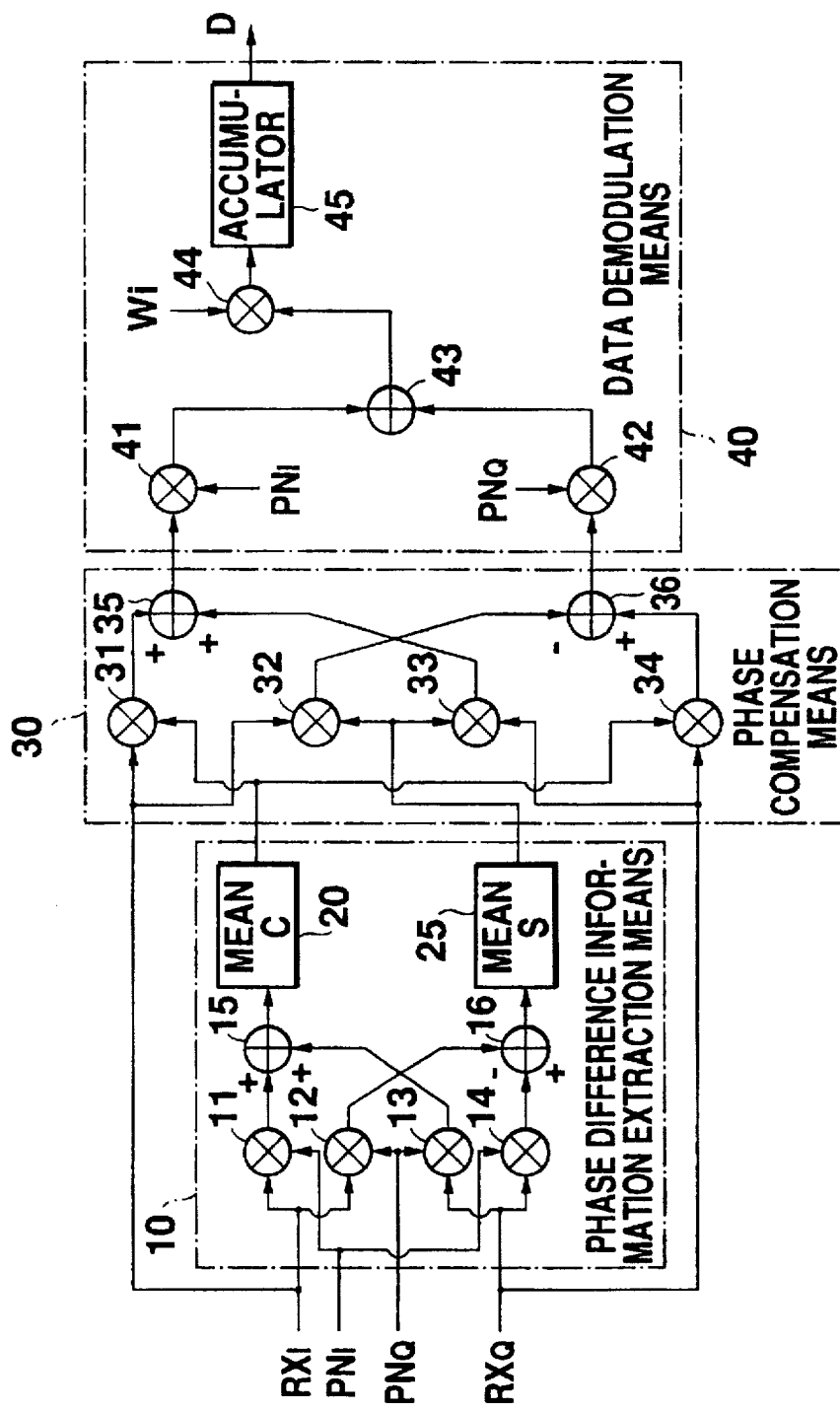
FIG. 1 is a configurational diagram of a data demodulator circuit in accordance with an embodiment of the present invention.

Referring first to FIG. 1 of the drawings, depicted is a data demodulator circuit configured in accordance with the present invention. In FIG. 1, input to a phase difference information extraction means generally designated at 10 are an in-phase axis received signal $RX_I$ and quadrature axis received signal $RX_Q$ along with an in-phase axis pseudo noise code $PN_I$ and an quadrature axis pseudo noise code $PN_Q$, from which is extracted information of phase difference by averaging sections meanC 20 and means 25. A phase compensation means 30 makes use of the thus extracted phase difference information to compensate for the influence of the phase difference remaining on $RX_I(t)$ and $RX_Q(t)$ after down converting, and outputs phase compensated in-phase axis component and quadrature axis component. In a data demodulation means generally designated at 40, the in-phase axis component and quadrature axis component are respectively multiplied by the in-phase pseudo noise code $PN_I$ and quadrature pseudo noise code $PN_Q$, and the respective products are added together through an adder 43. Then, the output of the adder 43 is multiplied by a Walsh function assigned to a mobile, and the product is accumulated for a symbol duration through an accumulator 45. It is to be noted throughout this specification that the output of the accumulator 45 is provided to a data decision means for deciding the data, or alternatively provided to a diversity combiner circuit and, after the diversity reception, further to the data decision means.

A more detailed action of the data demodulator circuit depicted in FIG. 1 will be described below. It is to be appreciated that since among the previously mentioned objects of the present invention the object to be achieved herein lies in conveniently compensating the phase difference θ remaining after the detection with a simple configuration, description is made of a case where δω is sufficiently small (φ=θ). Consideration will be given only to a path signal which the data demodulator circuit is tracking and receiving although a plurality of received path signal are contained in the in-phase axis received signal and the quadrature axis received signal. It is reported that the interference caused by the received path signals having different timing behaves like a Gaussian noise (at the accumulator output) upon demodulation (written by Allen Salmasi and Klein S. Gilhousen, entitled ON THE SYSTEM DESIGN ASPECTS OF CODE DIVISION MULTIPLE ACCESS (CDMA) APPLIED TO DIGITAL CELLULAR AND PRESONAL COMMUNICATIONS NETWORKS, 41st IEEE Vehicular Technology Conference).

As discussed earlier in the related arts, the in-phase axis received signal $RX_I(t)$ and quadrature axis received signal $RX_Q(t)$ are respectively written as:

$$RX_I(t) = \rho W(t)\{PN_I(t) \cos \theta - PN_Q(t) \sin \theta\}$$

$$RX_Q(t) = \rho W(t)\{PN_Q(t) \cos \theta + PN_I(t) \sin \theta\}$$

The outputs of multipliers 11 and 13 are respectively expressed as $RX_I(t) PN_I(t)$ and $RX_Q(t) PN_Q$. Therefore, since $PN_I^2(t) = PN_Q^2(t) = 1$, the output of an adder 15 is $$RX_I(t)PN_I(t) + RX_Q(t)PN_Q(t) =$$

$$\rho W(t)\{PN_I(t)\cos\theta - PN_Q(t)\sin\theta\}PN_I(t) +$$

$$\rho W(t)\{PN_Q(t)\cos\theta + PN_I(t)\sin\theta\}PN_Q(t) = 2\rho W(t)\cos\theta$$

Similarly, the outputs of the multipliers 12 and 14 are represented as $-RX_I(t) PN_Q(t)$ and $RX_Q(t) PN_I$, respectively. Hence, the output of an adder 16 will result in $$RX_Q(t)PN_I(t) - RX_I(t)PN_Q(t)$$

$$= \rho W(t)\{PN_Q(t)\cos\theta + PN_I(t)\sin\theta\}PN_I(t) -$$

$$\rho W(t)\{PN_I(t)\cos\theta - PN_Q(t)\sin\theta\}PN_Q(t) = 2\rho W(t)\sin\theta$$

The outputs of the adder 15 and 16 are provided as inputs to the averaging sections meanC 20 and meanS 25 respectively. As compared with the conventional configurations depicted in FIG. 33 and 34, cos θ extracted components and sin θ extracted components are respectively added coherently (or in the same direction on vectror) by the adders prior to inputting to the averaging sections. On the contrary, noise input to the respective adders are added at random due to their mutual independence. Thus, the same averaging time would allow an extraction of the phase difference information to be less influenced by the noise.

Figure 2:
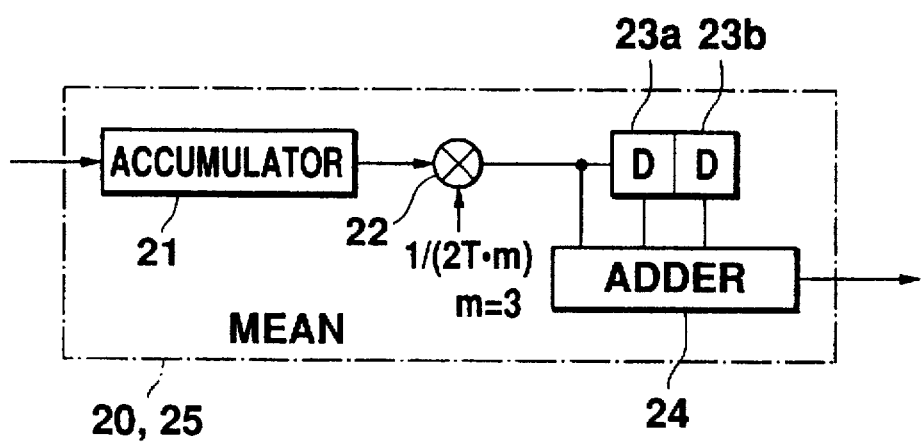
FIG. 2 is a configurational diagram of an averaging section.

FIG. 2 depicts a detailed configuration of the averaging sections meanC 20 and means 25. The output of the adder 15 or 16 is input to an accumulator 21 included within the averaging section meanC 20 or means 20, and is integrated (accumulated) over one symbol duration T. The integral for the averaging section mean C20 can be written as $$\int 2\rho W(t) \cos \theta dt = 2\rho \Sigma \alpha_i d_i(t) Wi(t) \cos \theta dt$$

(where ∫ represents the integral over one symbol duration). If the integral time is a symbol duration T, then the integral result becomes zero without $W_0(t)$ [=1] by virtue of the orthogonality of the Walsh function. Inasmuch as i=0 leads to a Walsh function assigned to a pilot signal which is unmodulated ($d_0=1$), the averaging section meanC 20 yields the output of $2T\rho\alpha_0 \cos \theta$. In the same manner, the output of the means 25 results in $2T\rho\alpha_0 \sin \theta$.

The outputs of the accumulator 21 also include other multipath signals or noise components arising from, e.g., thermal noise, so that the accumulator outputs are provided to shift registers 23a and 23b, the contents derived from which are added together and averaged through an adder 24 to decrease the influence of the noise. The shift register acts to shift in sequence the accumulator outputs which are to be input at intervals of T. Although a two-stage shift register is shown employed in this embodiment, the number of stages should be set optimally depending on the signal strength, phase jitter in the received signal arising from the movements of mobiles, and so on. Interposed between the accumulator 21 and the shift register 23a is a multiplier 22 serving as a weighting circuit for normalization in which a coefficient is set to 1/(2T.m) with m being the number of inputs to the adder 24 (the number of steps in the register= m−1). The outputs of the adder 24 less influenced by the noise are outputs $\rho\alpha_0 \cos \theta$, $\rho\alpha_0 \sin \theta$ of the averaging sections meanC 20 and means 25, in other words, the outputs of the phase difference information extracting means.

Figure 33:
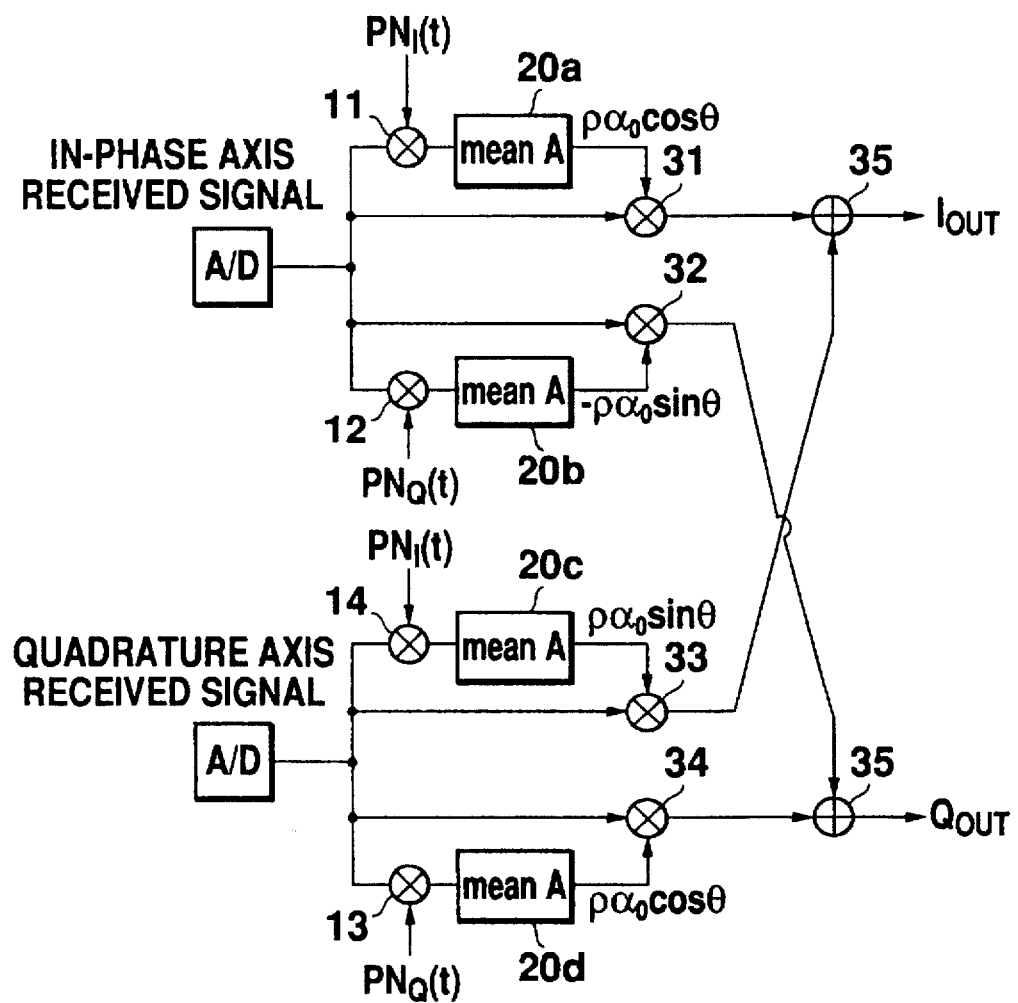
FIG. 33 shows a configuration of a phase difference information extracting section and a phase compensating circuit constituting another conventional apparatus.
Figure 34:
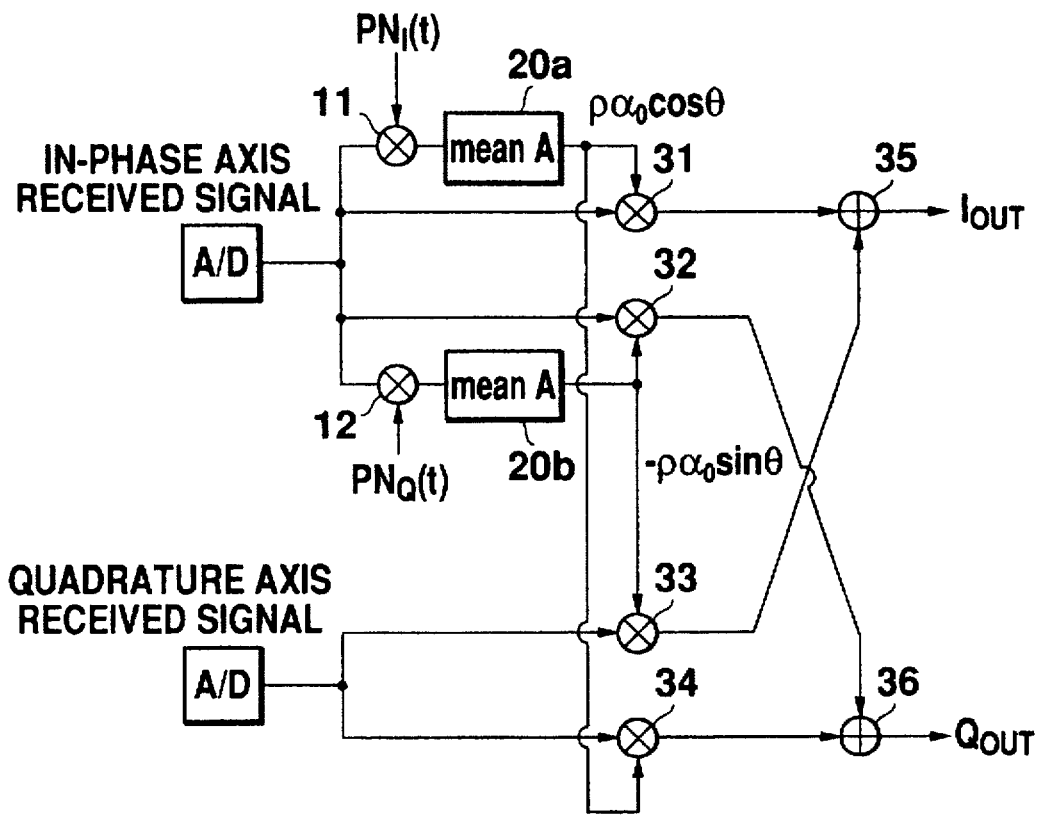
FIG. 34 shows a configuration of a phase difference information extracting section and a phase compensating circuit contained within a further conventional apparatus.

As in the conventional examples depicted in FIGS. 33 and 34, there is an action compensating for the influence of a residual phase after down converting contained in a received signal, by use of the phase difference information extracted by the phase difference information extraction means. The adder 35 outputs $\rho^2\alpha_0 S_I(t)$ obtained by adding to $\rho S_I(t)$ a coefficient $\rho\alpha_0$, while the adder 36 outputs $\rho^2\alpha_0 S_Q(t)$, as discussed previously. The outputs of the adders 35 and 36 are comprised of in-phase axis components and quadrature axis components cleared of the influence of the phase difference, which are in turn provided as, the outputs of the phase compensation means to the data demodulation means.

In the data demodulation means, the in-phase axis components are multiplied by $PN_I(t)$ whereas the quadrature axis components are multiplied by $PN_Q(t)$, and the thus obtained products are added together to derive the following output.

$$\rho^2\alpha_0 S_I(t)PN_I(t) + \rho^2\alpha_0 S_Q(t)PN_Q(t)$$

$$= \rho^2\alpha_0[S_I(t)PN_I(t) + S_Q(t)PN_Q(t)]$$

$$= \rho^2\alpha_0 W(t)[PN_I^2(t) + PN_Q^2(t)]$$

$$= 2\rho^2\alpha_0 W(t)$$

Then, the multiplier 44 acts to multiply the output of the adder 43 by the Walsh function $W_i(t)$ assigned to the mobile, resulting in $$2\rho^2\alpha_0 W(t)W_i(t) = 2\rho^2\alpha_0 W_i(t)\Sigma\alpha_i d_i(t)W_i(t)$$

which is in turn output to the accumulator 45. The accumulator 45 executes the accumulation of outputs of the multiplier 44. Due to the orthogonality of the Walsh function, $\alpha_i d_i(t)W_i(t)$ is only extracted from among the multiplexed signal at the accumulator output, with the result that $2\rho^2\alpha_0\alpha_i d_i(t)$ is the output of the data demodulation means.

Although disclosed herein is a manner of executing the normalization by the multiplier 22 between the accumulator and the shift register, the normalization may be carried out at the accumulator input or the adder output, or separately at a plurality of points. The normalization can be performed at the most appropriate point such as a point least influenced by the quantization error, depending on the number of quantization bits in the digital data or the number of stages in the shift register.

Embodiment 2

Figure 3:
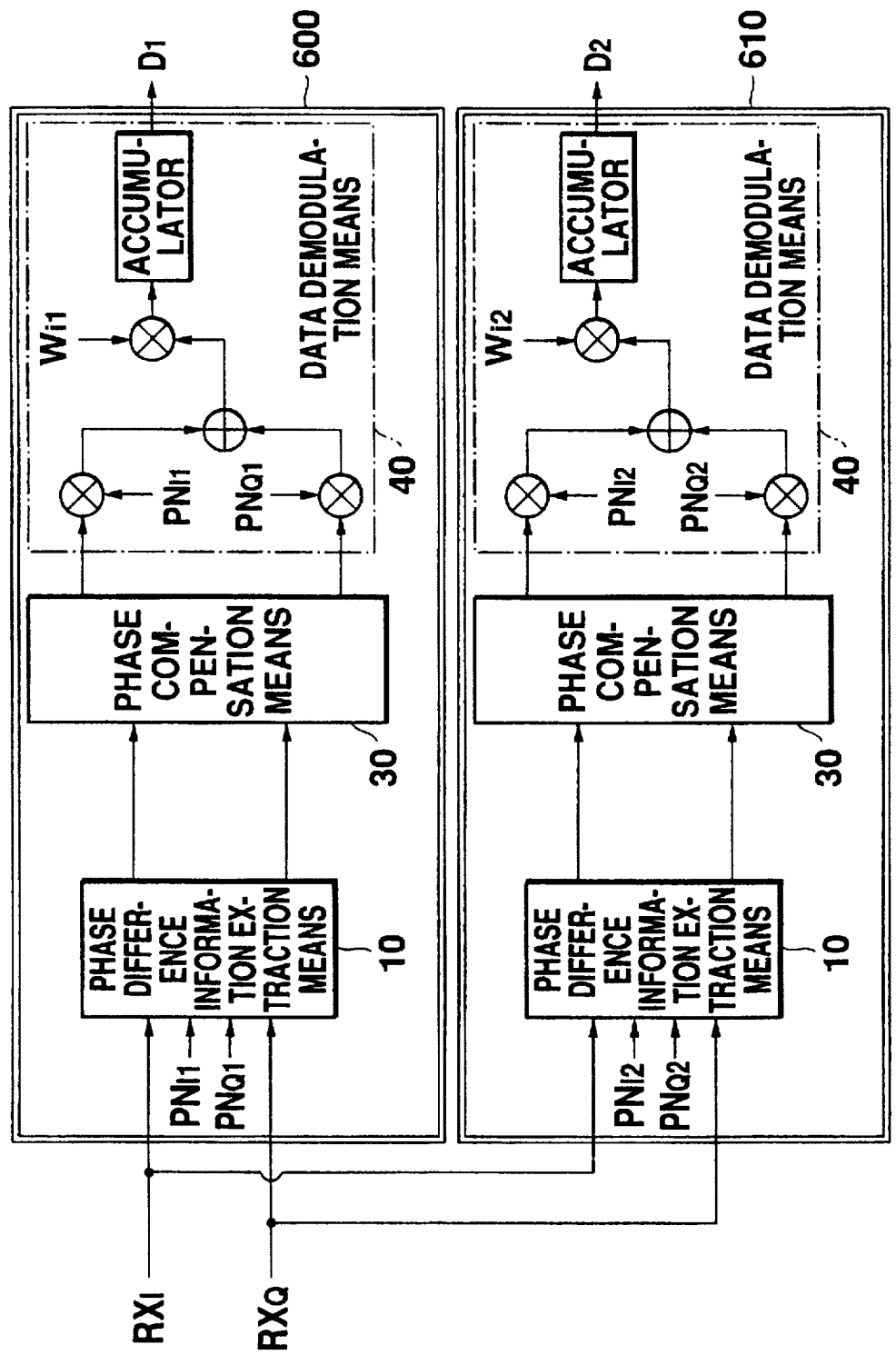
FIG. 3 depicts a configuration of a data demodulator circuit in accordance with another embodiment.

Referring next to FIG. 3, depicted is a configuration of a data demodulator in accordance with another embodiment of the present invention. First and second data demodulator circuits generally designated at 600 and 610, respectively, whose actions are substantially the same as the embodiment 1, are allowed to act on first and second received path signal, respectively. $PN_{I1}$, $PN_{Q1}$ and $W_{i1}$ denote pseudo noise codes and a Walsh function, respectively, associated with the first received path signal. $PN_{I2}$, $PN_{Q2}$ and $W_{i2}$ denote pseudo noise codes and a Walsh function, respectively, associated with the second received path signal. The first and second received path signals transmitted from the same cell-site are provided with the same pseudo noise codes and Walsh function, but differ in timing from each other. Some positional relationship between the mobile and the cell-site may permit a simultaneous transmission of signals from a plurality of cell-sites to the same mobile. In such a case, however, $PN_{I1}$, $PN_{Q1}$ and $W_{i1}$ will signify pseudo noise codes and a Walsh function used in a first cell-site, whereas $PN_{I2}$, $PN_{Q2}$ and $W_{i2}$ will signify pseudo noise codes and a Walsh function used in a second cell-site. These relationships apply to other embodiments which will be described later.

Figure 4:
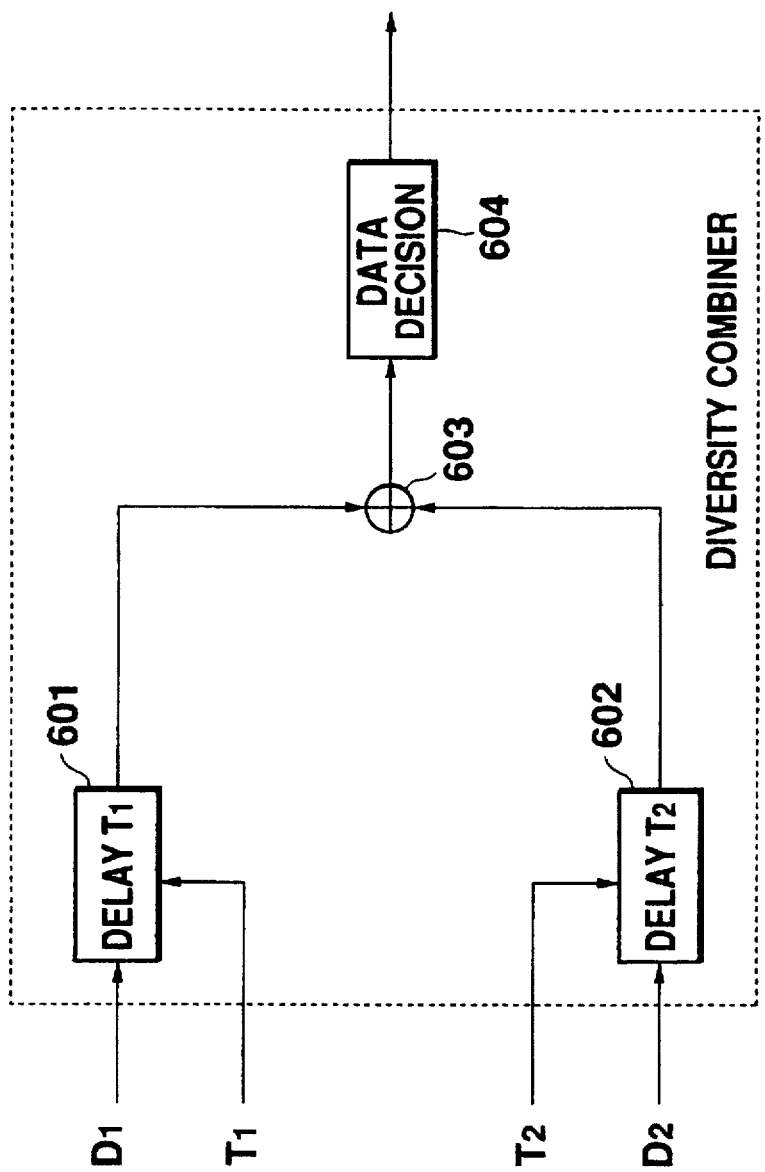
FIG. 4 depicts a configuration of a diversity combiner circuit.

Outputs $D_1$ and $D_2$, respectively, of the data demodulator circuits 600 and 610 are provided to a diversity combiner circuit depicted in FIG. 4 where the outputs $D_1$ and $D_2$ are time delayed by delay means 601 and 602 so as to present the same timing. Their respective delay times $T_1$ and $T_1$ are determined by a searcher receiver 5 or the data demodulator circuits 600 and 610, a control processor 8, etc within the same receiver. The delay circuit outputs, after the addition by an adder 603, are provided to a data decision means 604 for data decision. In this diversity combiner circuit, the coefficients $\rho_1\alpha_0$ and $\rho_2\alpha_0$ are simultaneously multiplied when phase compensated by the phase compensation means 30 of the data demodulator circuits 600 and 610. $\rho_1$ and $\rho_2$ designate herein received amplitudes, respectively, of the first and second received path signals. More specifically, since weighting has already been performed depending on a receive level which is necessary for the execution of the maximal ratio combining diversity reception, the diversity combiner circuit is only required to add the time delayed output, which will remarkably contribute to the simplification of the circuit. Also, the phase compensation and weighting corresponding to amplitudes makes use of the result obtained by averaging only single pilot signal contained in received path signals to be demodulated in the respective data demodulator circuits. Accordingly, as long as the number of stages in the shift register of the averaging section is optimally set, optimum weighting will be ensured on the phase compensation and level necessary for the maximal ratio combining, thereby realizing a maximum ratio combining diversity reception which has been sufficiently relieved of the adverse influence of the noise, as compared with the case using the phase information and amplitude information subjected to considerable influence of the noise from the searcher receiver. Thus, preferred effects of the diversity reception are ensured to significantly improve the data demodulating characteristics.

Embodiment 3

Figure 5:
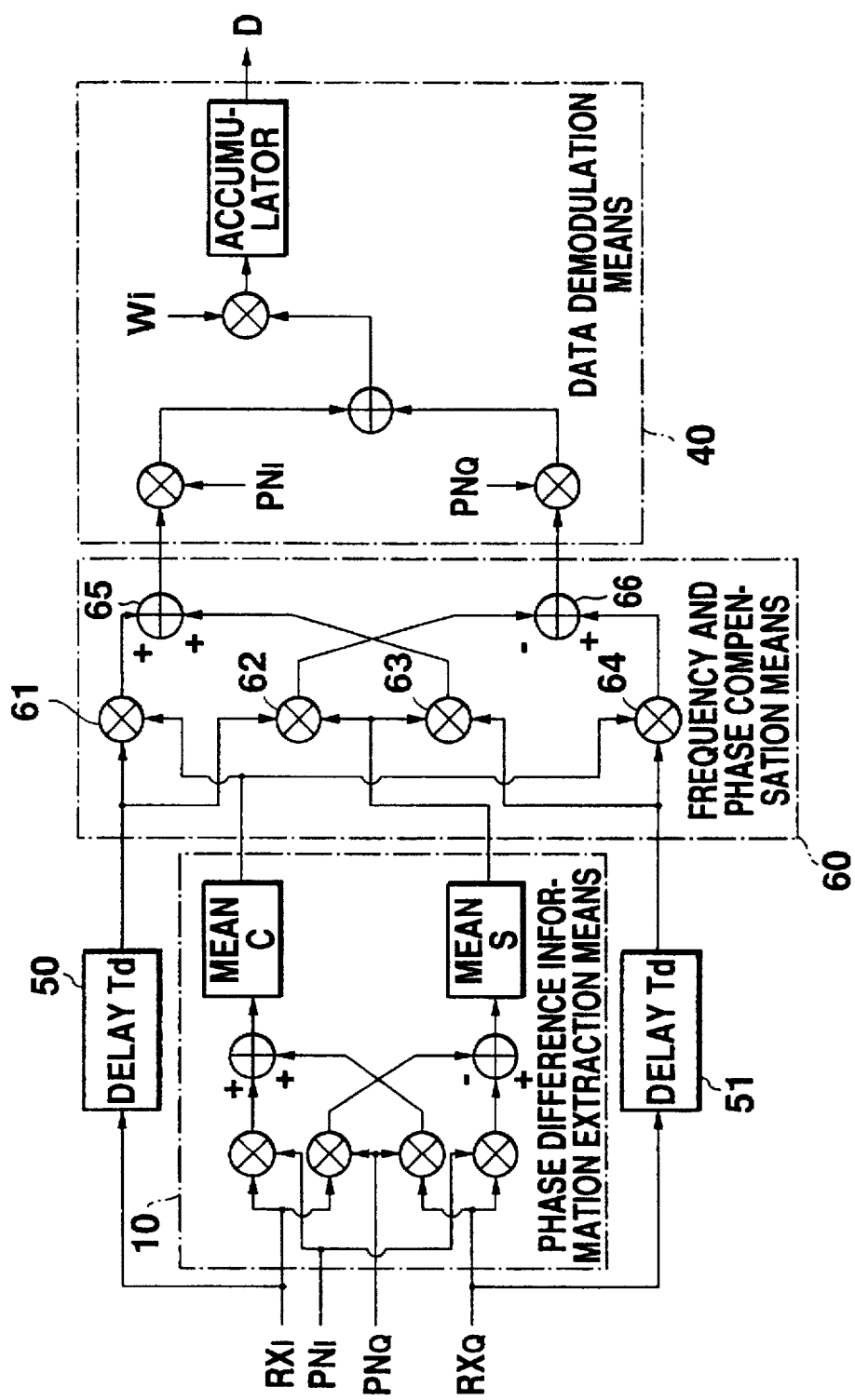
FIG. 5 illustrates a data demodulator circuit configured in accordance with a further embodiment.

FIG. 5 is a diagram showing a configuration of a data demodulator circuit in accordance with a further embodiment of the present invention, which differs from the embodiment 1 in the provision of delay means 50 and 51. A phase difference information extraction means 10 and a data demodulation means 40 are substantially the same as those in embodiment 1. A frequency and phase compensation means 60 is also configured in exactly the same manner as the phase compensation means 30, but differently referenced since the former enables frequency deviation to be compensated. The object of this embodiment, among the objects previously set forth, is to advantageously eliminate with a simple configuration, the influence of a carrier offset which may remain after the detection. The principle of embodiment of the FIG. 5 will be described hereinbelow.

Figure 30:
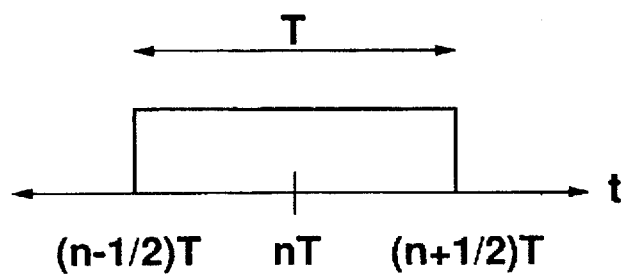
FIG. 30 is a diagram for illustrating a symbol timing.
Figure 31:
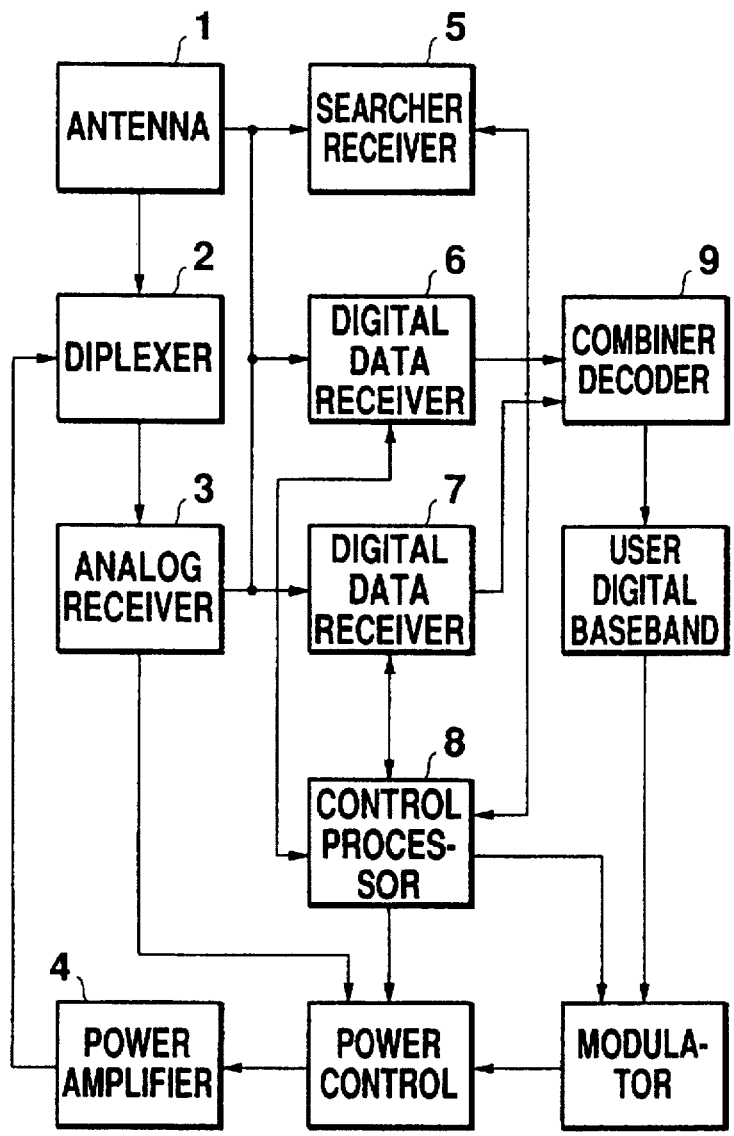
FIG. 31 is a block diagram of a conventional transmitter-receiver.
Figure 32:
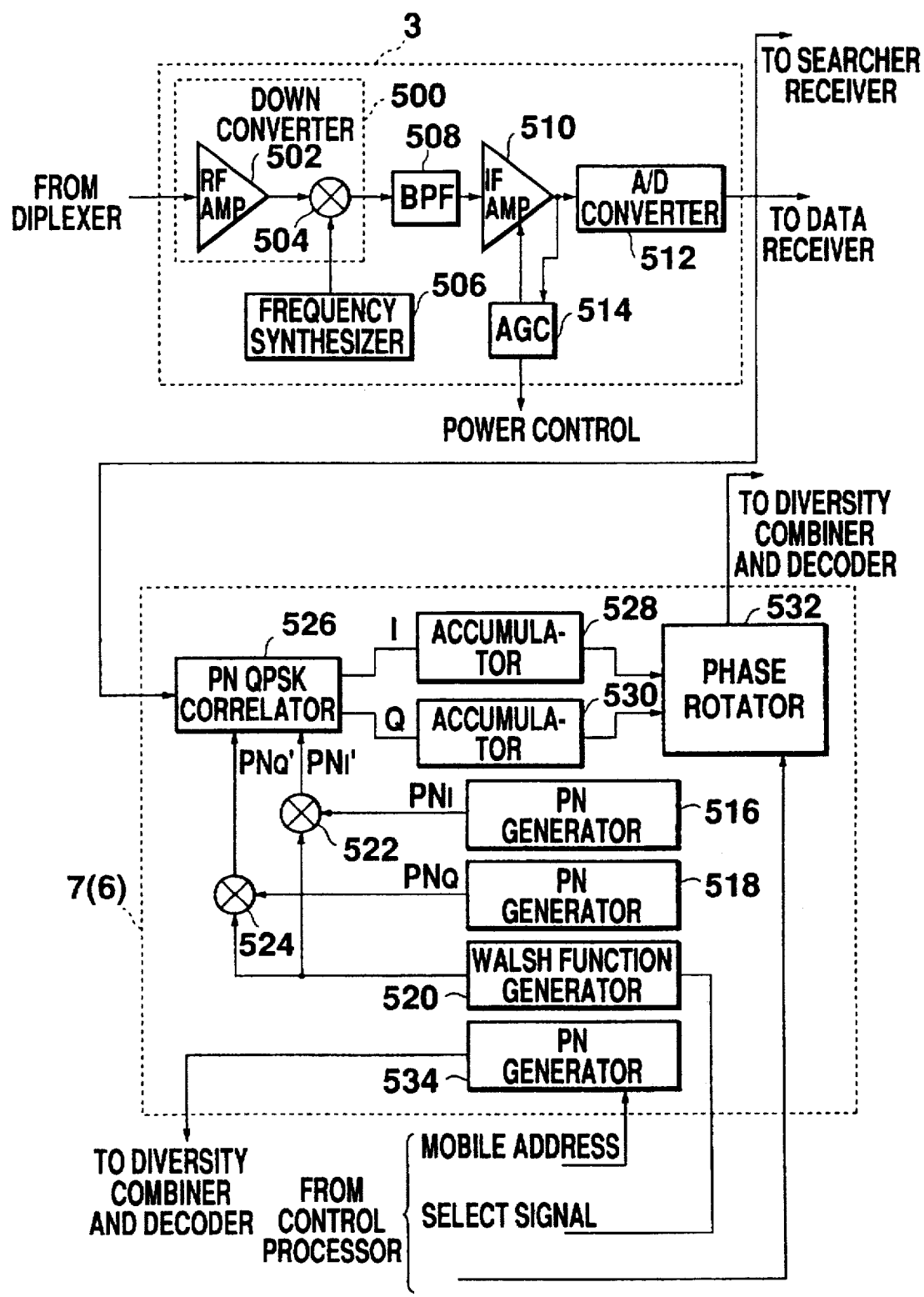
FIG. 32 is a configurational diagram of a data demodulator circuit employed in the conventional transmitter-receiver.

With a carrier offset present, an in-phase axis received signal and a quadrature axis received signal are respectively given as $$RX_I(t) = \rho W(t)\{PN_I(t) \cos \phi - PN_Q(t) \sin \phi\}$$

$$RX_Q(t) = \rho W(t)\{PN_Q(t) \cos \phi + PN_I(t) \sin \phi\}$$

where $\phi = \delta\omega t + \theta$ represents a time function. As seen in FIG. 30, if an n-th symbol is present over a period of time $(n-\frac{1}{2})T$ to $(n+\frac{1}{2})T$, then an average phase angle $\phi$ (n) of the n-th symbol can be written as $$\phi(n) = \delta\omega nT + \theta = n(\delta\omega T) + \theta = n\delta\phi + \theta$$

The accumulator 21 will take an operation time T with the result that there is a phase difference of only $\delta\phi$ between carrier offsets $\phi$ (n+1) contained in $RX_I(t)$ and $RX_Q(t)$ even if the accumulator 21 directly output to frequency and phase compensation means 60 without averaging by the adder 24 in FIG. 2. The adder 24 is intended to decrease the influence of noise, when the two-stage shift register is used which will average the phases of $\phi(n)$, $\phi(n-1)$, and $\phi(n-2)$ tends to cause a further increase in the phase difference with respect to the residual carrier offset $\phi$ (n+1) contained in $RX_I(t)$ and $RX_Q(t)$. However, if phase compensation is applied to an in-phase axis received signal and a quadrature axis received signal obtained by 2 symbol time delaying $RX_I(t)$ and $RX_Q(t)$, instead of $RX_I(t)$ and $RX_Q(t)$, based on the phase difference information extracted from the phase difference information extraction means, then the residual carrier offset of 2 symbols ago, when it is $\phi$ (n-1), will coincide with the carrier offset derived from the output of the adder 24. In consequence, if the delay time Td of the delaying means 50 and 51 is equal to 2T, then the influence of the carrier offset can be eliminated even if there may be a phase rotation $\delta\phi$ arising from the frequency deviation. All that is required in this embodiment against the frequency departure, is to provide the delay means, not to execute a $\tan^{-1}$ operation, which will lead to a simple configuration and decrease the amount of operation. It is to be noted that the delay means which is comprised of, e.g., a shift register must be shifted every at least one chip time and provided with the number of steps corresponding to the chip time duration and the delay time.

The action of the embodiment of FIG. 5 will be described hereinbelow. In the case where the shift register 23 includes two stages, by using a relationship $$\begin{aligned}
&\cos\{\phi(n)\} + \cos\{\phi(n-1)\} + \cos\{\phi(n-2)\} \\
&= \cos\{\phi(n-1)\} + \cos\{\phi(n)\} + \cos\{\phi(n-2)\} \\
&= \cos\{\phi(n-1)\} + 2\cos[\{\phi(n) + \phi(n-2)\}/2] * \\
&\quad \cos[\{\phi(n) - \phi(n-2)\}/2] \\
&= \cos\{\phi(n-1)\} + 2\cos(\delta\phi) * \\
&\quad \cos[(n-1)\delta\phi + \theta] \\
&= \cos\{\phi(n-1)\} + 2\cos(\delta\phi) * \cos\{\phi(n-1)\} \\
&= \cos\{\phi(n-1)\}[1 + 2\cos(\delta\phi)]
\end{aligned}$$

the output of the adder 24 located within the averaging section meanC 20 can be expressed as $$\rho\alpha_0(\tfrac{1}{3})[1 + 2\cos(\delta\phi)] * \cos\{\phi(n-1)\}$$

Similarly, using a relationship $$\sin\{\phi(n)\} + \sin\{\phi(n-1)\} + \sin\{\phi(n-2)\}$$
$$= \sin\{\phi(n-1)\} + \sin\{\phi(n)\} + \sin\{\phi(n-2)\}$$
$$= \sin\{\phi(n-1)\} + 2\sin[\{\phi(n) + \phi(n-2)\}/2] *$$
$$\cos[\{\phi(n) - \phi(n-2)\}/2]$$
$$= \sin\{\phi(n-1)\} + 2\cos(\delta\phi) *$$
$$\sin[(n-1)\delta\phi + \theta]$$
$$= \sin\{\phi(n-1)\} + 2\cos(\delta\phi) * \sin\{\phi(n-1)\}$$
$$= \sin\{\phi(n-1)\}[1 + 2\cos(\delta\phi)]$$

and the output of the adder 24 lying within the averaging section means 25 can be given as $$\rho\alpha_0(\tfrac{1}{3})[1+2\cos(\delta\phi)] * \sin\{\phi(n-1)\}$$

Accordingly, let the time delay Td of the delay means 50 and 51 be 2T (2 symbol time), then the carrier offset remaining after down converting, when it is $\phi(n-1)$, will coincide with the outputs derived from the adder 24. Hence, in the same manner as the embodiment 1, the influence of the carrier offset can be removed through the frequency and phase compensation means, exclusive of the coefficient $\rho\alpha_0$ ($\tfrac{1}{3}$) [1+2 cos ($\delta\phi$)].

A component ($\tfrac{1}{3}$)[1+2 cos ($\delta\phi$)] of the coefficient can be considered as a loss depending on $\delta\phi$ and caused by an averaging operation. With $\delta\phi=0$ ($\phi=\theta$) the coefficient will result in $\rho\alpha_0$ (no loss), and a carrier offset including only a phase difference $\theta$ will lead to just the same effects as in the case of the embodiment 1. With the increase of $\delta\phi$ the value of the coefficient will be decreased, and finally becomes zero at $\delta\phi=\pm 2\pi/3$, when no phase difference information is extracted. Therefore, in the case of a two-stage shift register, the compensation limit is defined as $\delta\phi$ (the amount of phase rotation per symbol)=$2\pi/3$ rad.

The compensation limit varies depending on the number of steps of the shift register. In the case where the number of steps in the shift register is, for example, four (that is, the number of times of addition in the adder is five), the outputs of the averaging sections meanC 20 and means 25 will be respectively given as $$\rho\alpha_0(\tfrac{1}{5})[1+2\cos(2\delta\phi)+2\cos(\delta\phi)]\cos\{\phi(n-3)\}$$

$$\rho\alpha_0(\tfrac{1}{5})[1+2\cos(2\delta\phi)+2\cos(\delta\phi)]\sin\{\phi(n-3)\}$$

This will lead to the necessity of setting the delay time Td of the delay means 50 and 51 to 4T. In this instance, an increase in the number of averaging steps will allow the influence of the noise to be further reduced. It is to be appreciated that $\delta\phi$ at the compensation limit is $0.4\pi$ rad so that the maximum frequency offset amount to be compensated for will decrease. On the contrary, in the case where the number of stages in the shift register is one, the outputs of the averaging section meanC 20 and meanS 25 can be respectively given as $$\rho\alpha_0(\tfrac{1}{2})2\cos(\delta\phi/2)\cos\{\phi(n-\tfrac{1}{2})\}$$

$$\rho\alpha_0(\tfrac{1}{2})2\cos(\delta\phi/2)\sin\{\phi(n-\tfrac{1}{2})\}$$

This will lead to the necessity of setting the delay time Td of the delay means 50 and 51 to 1.5T. In this instance, a decrease in the number of averaging steps will allow the influence of the noise to be increased, but $\delta\phi$ at the compensation limit is $\pi$ so that the maximum frequency offset amount to be compensated for will increase. The output of the phase difference information extraction means 10 can be derived from the formula for summation of trigonometric functions, in the same manner as in the case of the two-stage shift register.

Although the above description has been made with the compensation limit being $\delta\phi$ where the output of the phase difference information extraction means 10 can be zero, it will be apparent that the phase difference information extraction means 10 is gradually decreasing output values accordingly as the compensation limit is approached. Also when the carrier offset becomes greater, the outputs (correlative values) of the accumulators 21 within the averaging sections meanC 20 and means 25 decrease. The amounts of decreasing in the outputs are reported in, for example, Transaction of IEICE, Vol. J69-B No. 11, pp. 1540–1547. On the contrary, the influence of the noise will be gradually increased due to loss incidental to the averaging operation and to reduction in the accumulator outputs, since noise components contained in the outputs of the accumulators 21 are independent of the carrier offset. For the mobile, care must be taken of the above when deciding the number of stages in the shift register. To this end, it is preferable that the decision be so made as to fit the actual system, taking into consideration the degree of loss, the lowered accumulator outputs (correlative values), noise influence reduction effects attendant on the increase of the number of stages in the shift register, compensation limit of the carrier offset, and so on. When delay means such as 50 and 51 are introduced, it should be noted that pseudo noise codes used in data demodulation means such as 40 must be time delayed corresponding to delay time Td throughout this specification.

Embodiment 4

Figure 6:
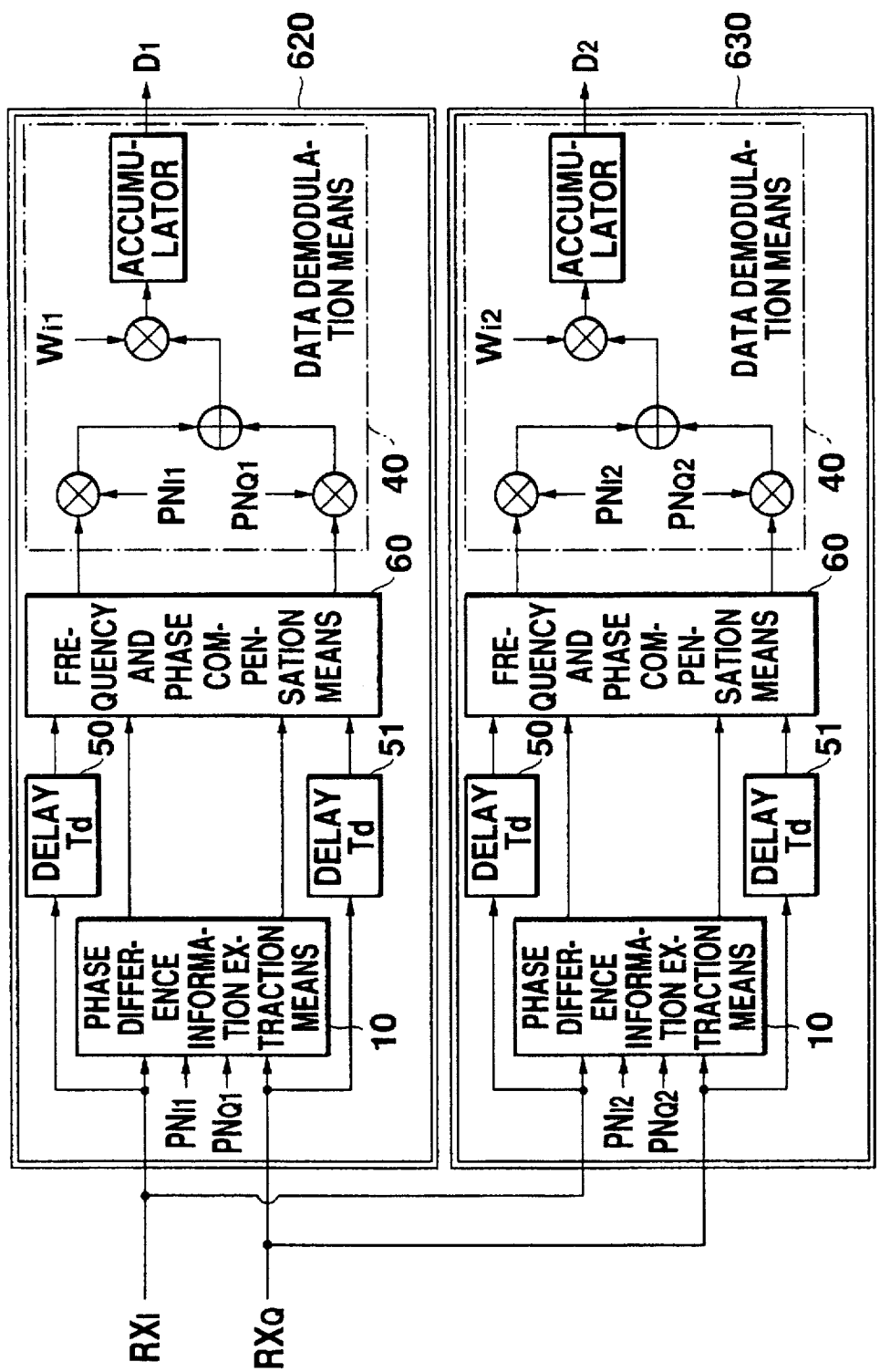
FIG. 6 illustrates a data demodulator circuit configured in accordance with still another embodiment.

FIG. 6 depicts a configuration of a data demodulator circuit in accordance with still another embodiment of the present invention. Shown are first and second data demodulator circuits generally designated at 620 and 630, respectively, whose actions are substantially the same as those of embodiment 3. By virtue of delay means 50 and 51 provided in each of the data demodulator circuits 620 and 630, an input to the diversity combiner circuit depicted in FIG. 4 will ensure, besides the effects of the embodiment 2, the same effects irrespective of the presence of any frequency deviation, thereby eliminating the influence of the carrier offset with a simple configuration and implementing a preferred maximal ratio combining diversity action.

Embodiment 5

Figure 7:
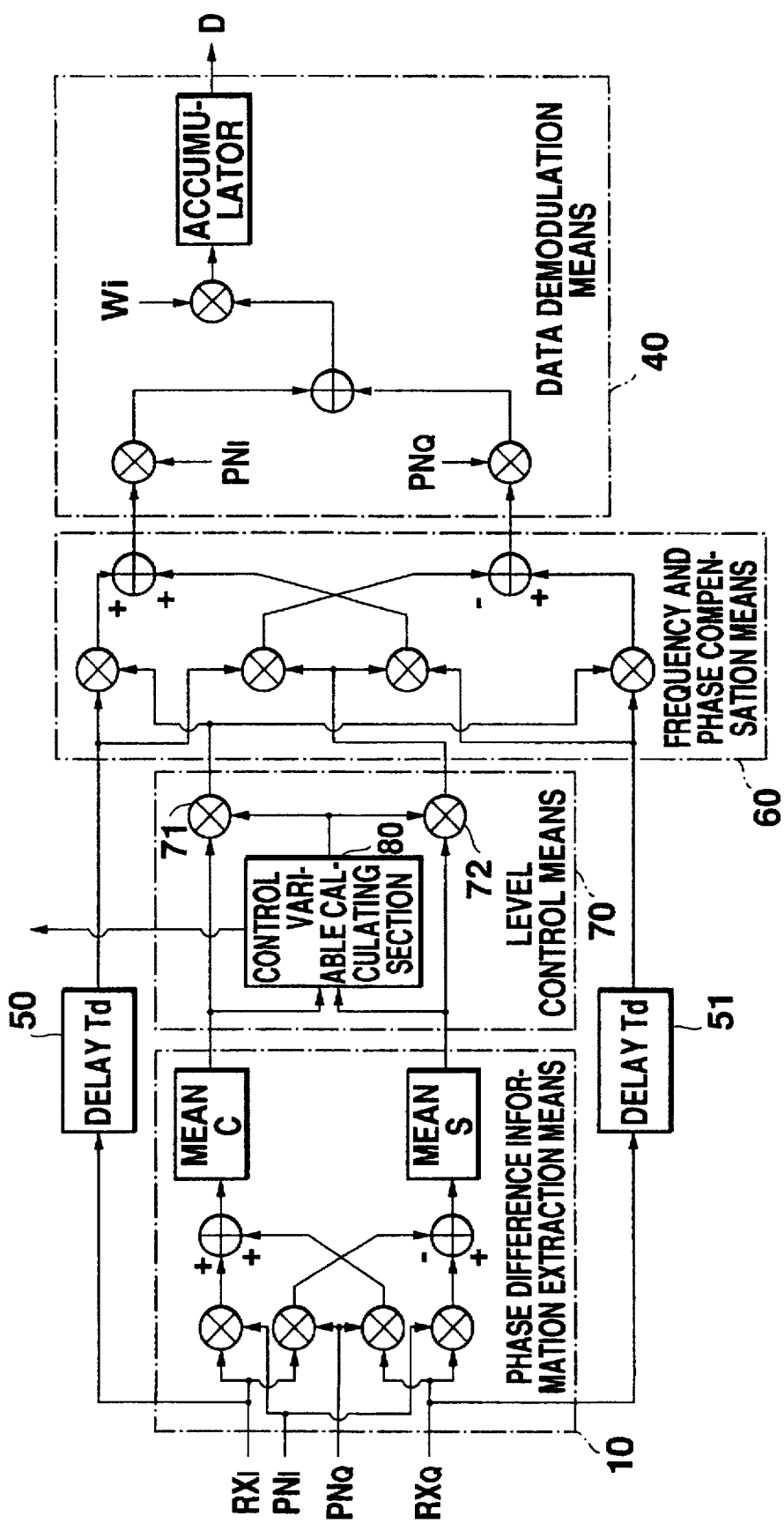
FIG. 7 is a configurational diagram of a data demodulator circuit in accordance with a still further embodiment.

FIG. 7 illustrates a configuration of a data demodulator circuit in accordance with a still further embodiment of the present invention, which differs from embodiment 3 in the interposition of a level control means 70 between a phase difference information extraction means 10 and a frequency and phase compensation means 60, although otherwise coincident with embodiment 3. In the description of embodiment 3, the outputs of the averaging sections meanC 20 and means 25, if the number of stages in the shift register is two, have been respectively given as $$\rho\alpha_0(\tfrac{1}{3})[1+2\cos(\delta\phi)] * \cos\{\phi(n-1)\}$$

$$\rho\alpha_0(\tfrac{1}{3})[1+2\cos(\delta\phi)] * \sin\{\phi(n-1)\}$$

Among them, true phase difference information is only cos $\{\phi(n-1)\}$ and sin $\{\phi(n-1)\}$, the coefficient parts being used to multiply, in the frequency and phase compensation means output, the in-phase axis component and quadrature axis component, $RX_I$ and $RX_Q$ which take the form of digital data converted into digital signals by an analog-to-digital converter are A/D converted after the execution of an operation such as AGC (automatic gain control) in the analog section so as to fit the number of bits indicative of digital data. Therefore, in the case that the number of bits left is scarce, the influence of the quantization error may possibly increase if the amplitude is also undesirably converted with the multiplication of the coefficient when executing the carrier offset compensation. In particular, mobiles are commonly designed to include a minimum number of bits in view of the reduced hardware scale and lower power consumption. Thus, the data demodulator circuit disclosed in this embodiment 5 is so configured as to ensure substantially the same effects as embodiment 3 with respect to the compensation for the carrier offset and to prevent any amplitude conversion at the time of compensation.

Figure 8:
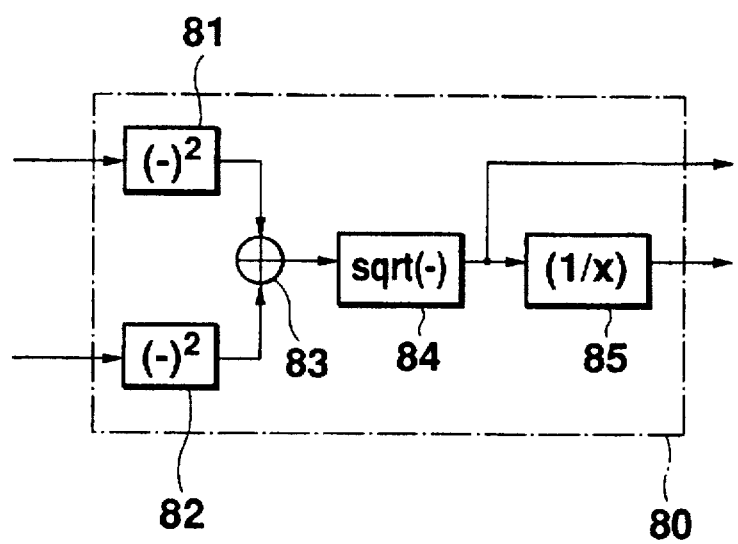
FIG. 8 is a configurational diagram of a controlled variable calculating section.

The level control means 70 was provided to cope with a lower number of bits than described above, which includes a control variable calculating section 80 for calculating a control variable from the output of the phase difference information extraction means and includes multipliers 71 and 72 for multiplying the phase difference information extraction means output by the thus obtained control variable, thereby constantly keeping the level invariable to the input. Detailed configuration of the controlled variable calculating section 80 is shown in FIG. 8. The outputs of the phase difference information extraction means are respectively fed to squaring means 81 and 82 which find a sumsquare with the aid of an adder 83. By finding the sum-square, a square value of the coefficients is provided as the adder output, due to the identity of the coefficients associated with cosine and sine terms which carry phase difference information in the outputs of the averaging sections meanC 20 and means 25. Then a square root calculating means 84 calculates a square root of the square value of the coefficients to thereby obtain a magnitude of the coefficients. The square root calculation means may be used as a level monitor. Afterwards, an inverse circuit 85 finds the inverse of the magnitude of the coefficients to calculate a control variable. Thus, the output of the control variable calculating section which is the inverse of the magnitude of the coefficients is multiplied through the multipliers 71 and 72 by the output of the phase difference information extraction means, thereby allowing the phase difference information free of the influence of the coefficients to be output to the frequency and phase compensation means.

Embodiment 6

Figure 9:
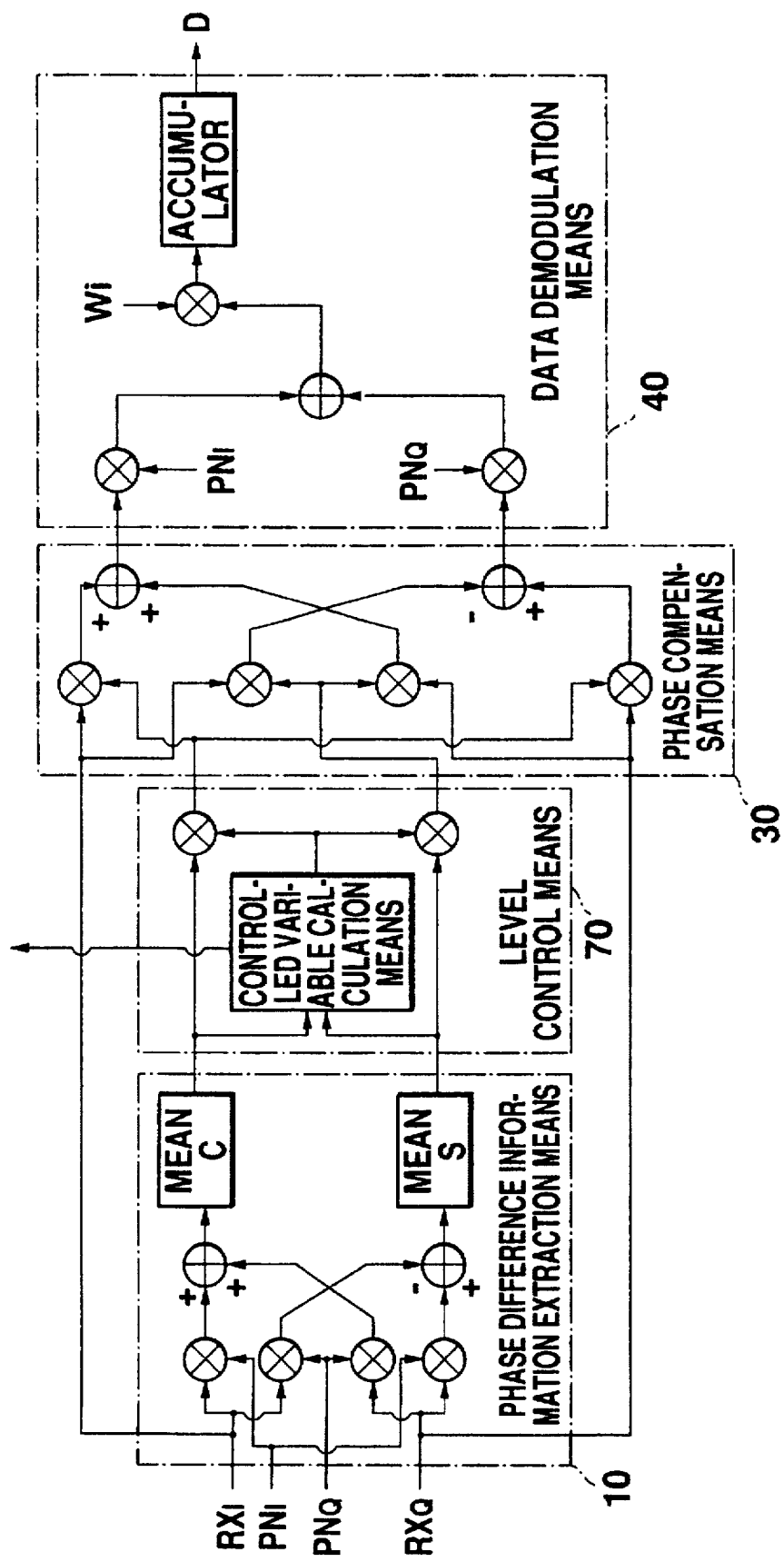
FIG. 9 depicts a configuration of a data demodulator circuit in accordance with yet another embodiment.

FIG. 9 depicts a configuration of a data demodulator circuit in accordance with yet another embodiment of the present invention, which differs from embodiment 5 in the point that the delay means 50 and 51 are absent. Such an arrangement can be taken in the case where the carrier offset is regarded as a phase offset θ with a sufficiently minute δφ. A sufficiently minute δφ would be the case, for example, where the accuracy of the local oscillator is good enough or where δφ is corrected by other means. In this instance, there is no need to provide any delay means, which will lead to a reduction in the dimensions of the circuit.

Embodiment 7

Figure 10:
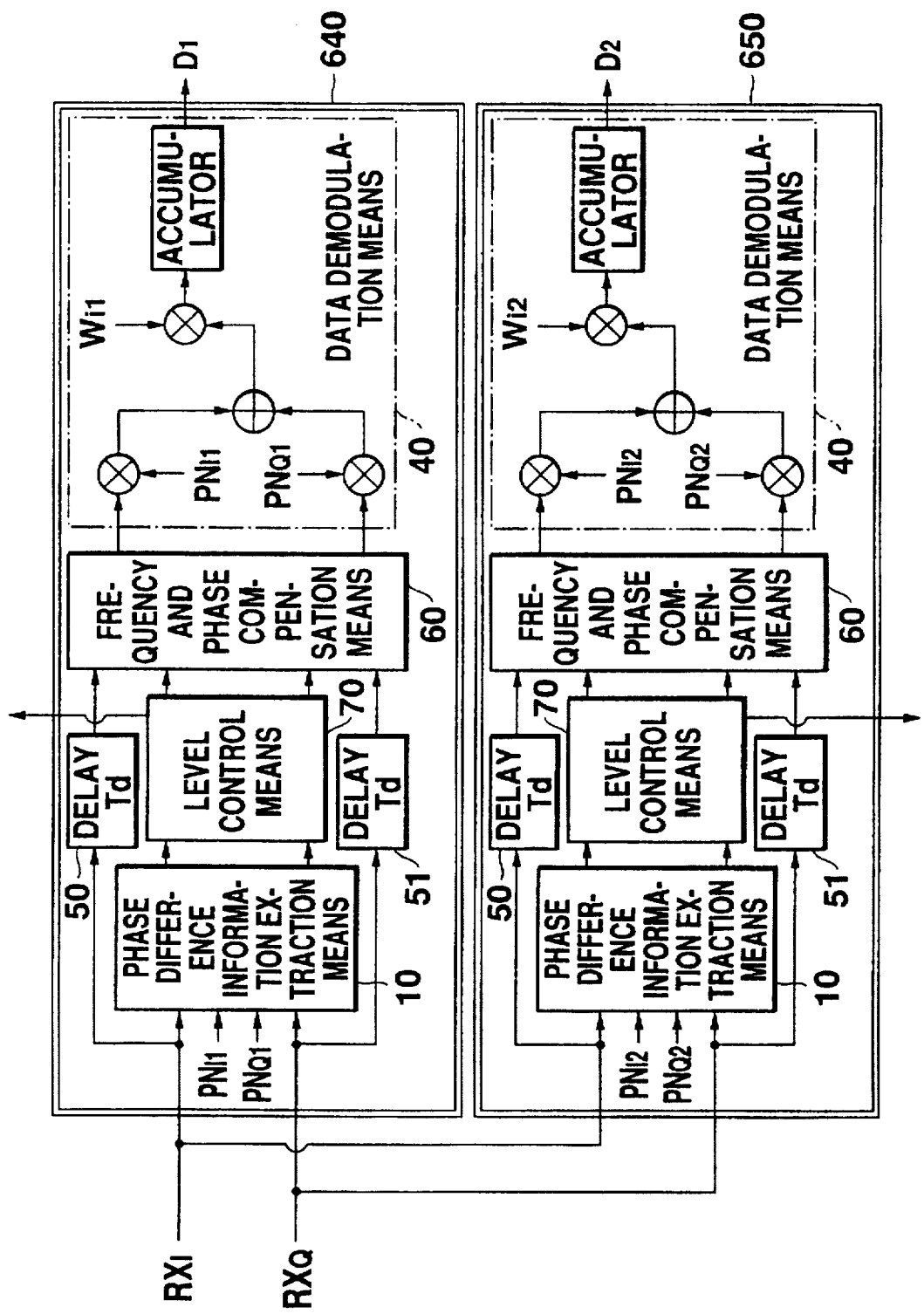
FIG. 10 depicts a configuration of a data demodulator circuit in accordance with a yet further embodiment.
Figure 27:
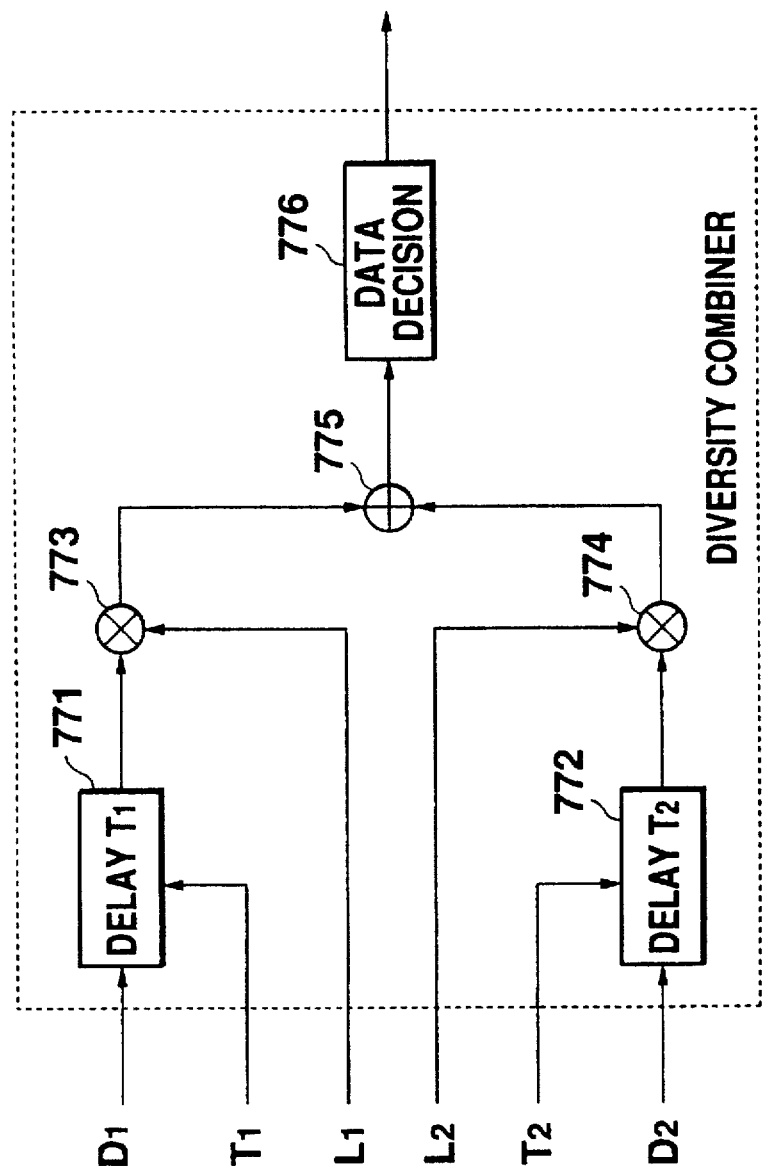
FIG. 27 depicts a configuration of another diversity combiner circuit.

FIG. 10 depicts a configuration of a data demodulator circuit in accordance with a further embodiment of the present invention, in which generally designated at 640 and 650 are respectively first and second data demodulator circuits whose actions are substantially the same as in the embodiment 5. The data demodulator circuits 640 and 650 each include a level regulating means 70 by virtue of which the amplitude is not permitted to vary in a frequency and phase compensation means 60, ensuring an effective operation irrespective of a reduced number of quantized bits. It will be noted when implementing the maximal ratio combining diversity action that a diversity combiner circuit must execute a multiplication of the coefficient proportional to the amplitude. Illustrated in FIG. 27 is a diversity combiner circuit acting to implement the maximal ratio combining diversity reception from the outputs of the data demodulator circuits 640 and 650. The diversity combiner circuit is different from that of FIG. 4 in that the former includes multipliers 773 and 774 respectively interposed between time-adjustment delay means 771 and 772 and an adder 775 and intended to execute the multiplication of the coefficient proportional to the amplitude. The coefficient proportional to the amplitude is derived from the square root calculation means 84 of the controlled variable calculating section depicted in FIG. 8, so that the maximal ratio combining diversity action can be easily implemented without any additional means and processes. It will be understood that the positional relationship may be reversed between the delay means 771 and the multiplier 773. The same can be said of that between the delay means 772 and the multiplier 774.

Embodiment 8

Figure 11:
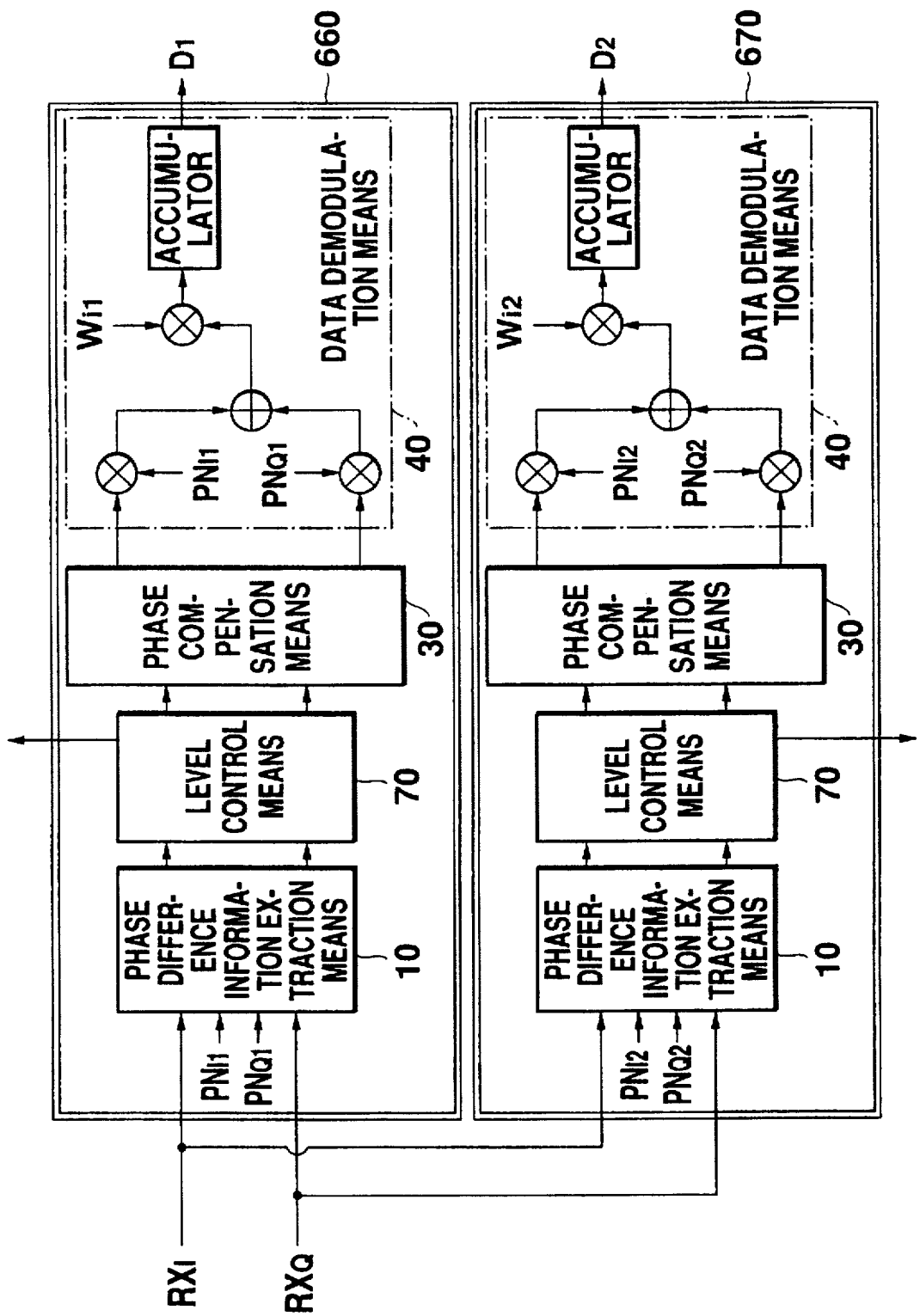
FIG. 11 illustrates a data demodulator circuit configured in accordance with yet still another embodiment.

FIG. 11 depicts yet another embodiment of a data demodulator circuit configured in accordance with the present invention, differing from embodiment 7 in the point that it excludes the delay means 50 and 51. Such an arrangement can be taken insofar as the carrier offset is regarded as a phase offset θ with a sufficiently minute δφ. A sufficiently minute δφ would be the case, for example, where the accuracy of the local oscillator is good enough or where δφ is corrected by other means. This will require no delay means and accomplish the reduction in size of the circuit.

Embodiment 9

Figure 12:
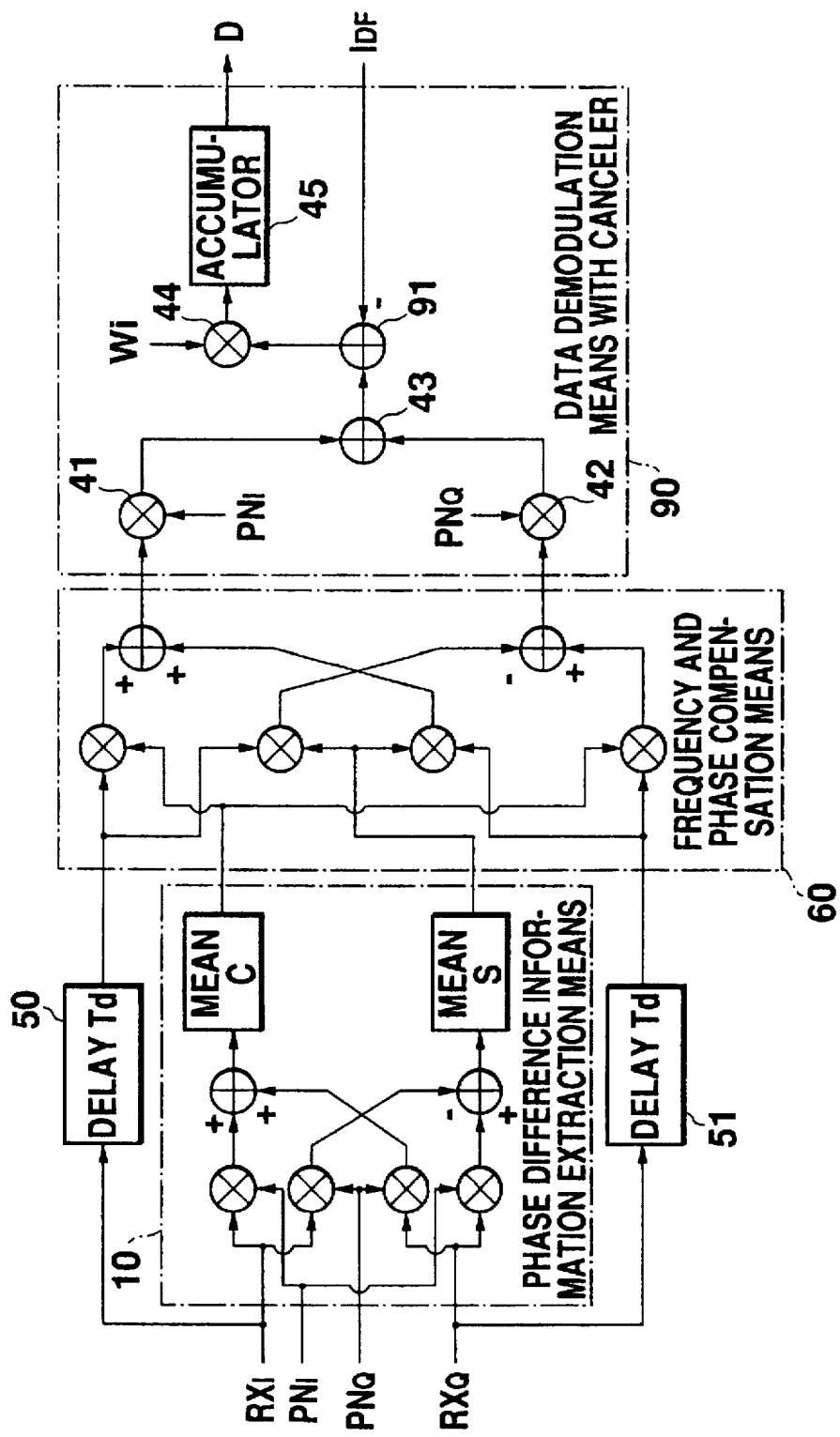
FIG. 12 illustrates a data demodulator circuit configured in accordance with a yet still further embodiment.

FIG. 12 depicts a still further embodiment of a data demodulator circuit configured in accordance with the present invention.

Although in the embodiments 1 to 8 notice has been exclusively taken of received path signal, actually there also exist path signals with different timing, or signals transmitted from other cell-sites. These can be regarded as random noises causing a deterioration of the data demodulation characteristics. It is however difficult to calculate a noise quantity at the time of demodulation due to the necessity of processing enormous operations. Nevertheless, the mobile continues to constantly monitor pilot signals contained in the received path signals so as to obtain information on reception timing, phases, etc., of at least pilot signals having higher levels. Among the objects set forth previously, the object of this embodiment is to provide a demodulator circuit allowing, based on the information on reception timing, phases, etc., of the pilot signals, a calculation of the amount of interference caused by pilot signals with different timing, and including a demodulation means capable of eliminating the interference amount. Besides from FIG. 5 indicative of embodiment 3, FIG. 12 shows an interference amount calculation means as well as a data demodulation means with canceler having a canceler 91 for eliminating the interference amount. Substantially the same as embodiment 3 are the other constituent elements such as a phase difference information extraction means 10, frequency and phase compensation means 60, and delay means 50 and 51.

Description will be first made of the interference due to the pilot signals having different timing.

Now consider a case where a receiver receives two path signals with different timing. An earlier timing signal and a later timing signal are referred to as an forward wave and a delay wave, respectively.

A complex envelope RX(t) of a signal provided as the input to the data demodulator circuit can be expressed as $$RX(t) = \rho_1 S(t) \exp(j\phi_1) + \rho_2 S(t+\tau) \exp(j\phi_2)$$

where $\rho_1$ and $\phi_1$ denote a received amplitude and a carrier offset, respectively, of the forward wave; $\rho_2$ and $\phi_2$ denote a received amplitude and a carrier offset, respectively, of the delay wave; and $\tau$ denotes a difference in timing between the forward wave and the delay wave. In the event that the demodulator circuit of FIG. 12 is acting on the forward wave, the frequency and phase compensation means 10, as previously explained in embodiment 3, will execute an operation RX(t) * $\rho_1\alpha_0 \exp(-j\phi_1)$ with respect to RX(t), with result that the output of the frequency and phase compensation means 10 is provided as $$\rho_1^2\alpha_0 S(t) + \rho_1\alpha_0\rho_2 S(t+\tau) \exp[j(\phi_2-\phi_1)]$$

where a first term of the above expression represents a desired component, and a second term represents an interference factor arising from path signal with different timing. Description will be given of a behavior of the second term which is an interference factor, because the desired component having been explained in embodiment 1.

The second term can be arranged as $$\rho_1\alpha_0\rho_2 S(t + \tau) \exp[j(\phi_2 - \phi_1)] =$$

$$\rho_1\alpha_0\rho_2 W(t + \tau) \; [\{PN_I(t + \tau)\cos\Delta\phi -$$

$$PN_Q(t + \tau)\sin\Delta\phi\} + j\{PN_Q(t + \tau)\cos\Delta\phi + PN_I(t + \tau)\sin\Delta\phi\}]$$

In the above expression, the real component signifies an input of a multiplier 41, and the imaginary component signifies an input of a multiplier 42, with $\Delta\phi=\phi_2-\phi_1$. In the data demodulation means with canceler, the multiplier 41 serves to multiply the multiplier input by $PN_I(t)$ with respect to the interference factor, to thereby provide an output $$\rho_1\alpha_0\rho_2 W(t + \tau) \; \{PN_I(t + \tau)\cos\Delta\phi - PN_Q(t + \tau)\sin\Delta\phi\} \;*$$

$$PN(t) = \rho_1\alpha_0\rho_2 W(t + \tau) \; \{PN_{I2}\cos\Delta\phi + PN_{Q2}\sin\Delta\phi\} \;*\; PN_{I1}$$

Similarly, the multiplier 42 will provide an output $$\rho_1\alpha_0\rho_2 W(t + \tau) \; \{PN_Q(t + \tau)\cos\Delta\phi + PN_I(t + \tau)\sin\Delta\phi\} \;*$$

$$PN_Q(t) = \rho_1\alpha_0\rho_2 W(t + \tau) \; \{PN_{Q2}\cos\Delta\phi + PN_{I2}\sin\Delta\phi\} \;*\; PN_{Q2}$$

Hereinafter, such representations will be available as Wi(t)=$W_{i1}$, Wi(t+$\tau$)=$W_{i2}$, $PN_{I1}$=$PN_I(t)$, $PN_{Q1}$=$PN_Q(t)$, $PN_{I2}$=$PN_I(t+\tau)$, and $PN_{Q2}$=$PN_Q(t+\tau)$. The pilot signal being unmodulated, the pilot signal $W_{02}$ contained herein W(t+$\tau$) is all 1, and a power distribution coefficient is $\alpha_0$. Hence, among the interference factors contained in the outputs of the multipliers 41 and 42, the interference component arising from the delay wave pilot signal can be respectively expressed as $$\rho_1\alpha_0\rho_2\alpha_0\{PN_{I2} \cos \Delta\phi - PN_{Q2} \sin \Delta\phi\}*PN_{I1}$$

$$\rho_1\alpha_0\rho_2\alpha_0\{PN_{I2} \cos \Delta\phi - PN_{Q2} \sin \Delta\phi\}*PN_{Q1}$$

Then, among the interference factors contained in the output of the adder 43, the amount of interference $I_{DF1}$ caused by the delay wave pilot signal will be expressed in terms of the sum of the two expressions:

$$I_{DF1} = \rho_1\alpha_0\rho_2\alpha_0\{PN_{I2} \cos \Delta\phi - PN_{Q2} \sin \Delta\phi\}*PN_{I1} + \rho_1\alpha_0\rho_2\alpha_0\{PN_{I2} \cos \Delta\phi - PN_{Q2} \sin \Delta\phi\}*PN_{Q2}$$

Similarly derived is the amount of interference $I_{DF2}$ caused by the delay wave pilot signal among the interference factors contained in the output of the adder 43 within the data demodulator circuit acting on the delay wave.

$$I_{DF2} = \rho_1\alpha_0\rho_2\alpha_0\{PN_{I2} \cos \Delta\phi - PN_{Q2} \sin \Delta\phi\}*PN_{I1} + \rho_1\alpha_0\rho_2\alpha_0\{PN_{I2} \cos \Delta\phi - PN_{Q2} \sin \Delta\phi\}*PN_{Q2}$$

Consequently, upon condition that the mobile is capable of calculating $I_{DF}$ (=$I_{DF1}$=$I_{DF2}$) therewithin, then the interference associated with the delay wave pilot signal can be eliminated by subtracting $I_{DF}$ from the output of the adder 43 of the data demodulator circuit acting on the advance wave, whereas the interference associated with the advance wave pilot signal can be eliminated by subtracting $I_{DF}$ from the output of the adder 43 of the data demodulator circuit acting on the delay wave, thus accomplishing the improvement in demodulating characteristics.

Incidentally, $\rho_1\alpha_0 \cos \phi_1$ and $\rho_1\alpha_0 \sin \phi_1$ are derived from the averaging sections meanC 20 and means 25, respectively, constituting the phase difference information extraction means 10 within the data demodulator circuit operating on the forward wave, while $\rho_2\alpha_0 \cos \phi_2$ and $\rho_2\alpha_0 \sin \phi_2$ are derived from the averaging sections meanC 20 and means 25, respectively, constituting the phase difference information extraction means 10 within the data demodulator circuit operating on the delay wave. It is to be noted that the description herein has been made of a case, as previously explained in embodiment 3, where the averaging step attendant loss depending on the carrier offset is sufficiently small. Without direct representations in the diagrams, $PN_{I1}$ and $PN_{Q1}$ are delivered from a timing regenerating system of the data demodulator circuit acting on the forward wave, whereas $PN_{I2}$ and $PN_{Q2}$ are delivered from the timing regenerating system of the data demodulator circuit acting on the delay wave, where all of them should be reflected the delay time Td.

Figure 13:
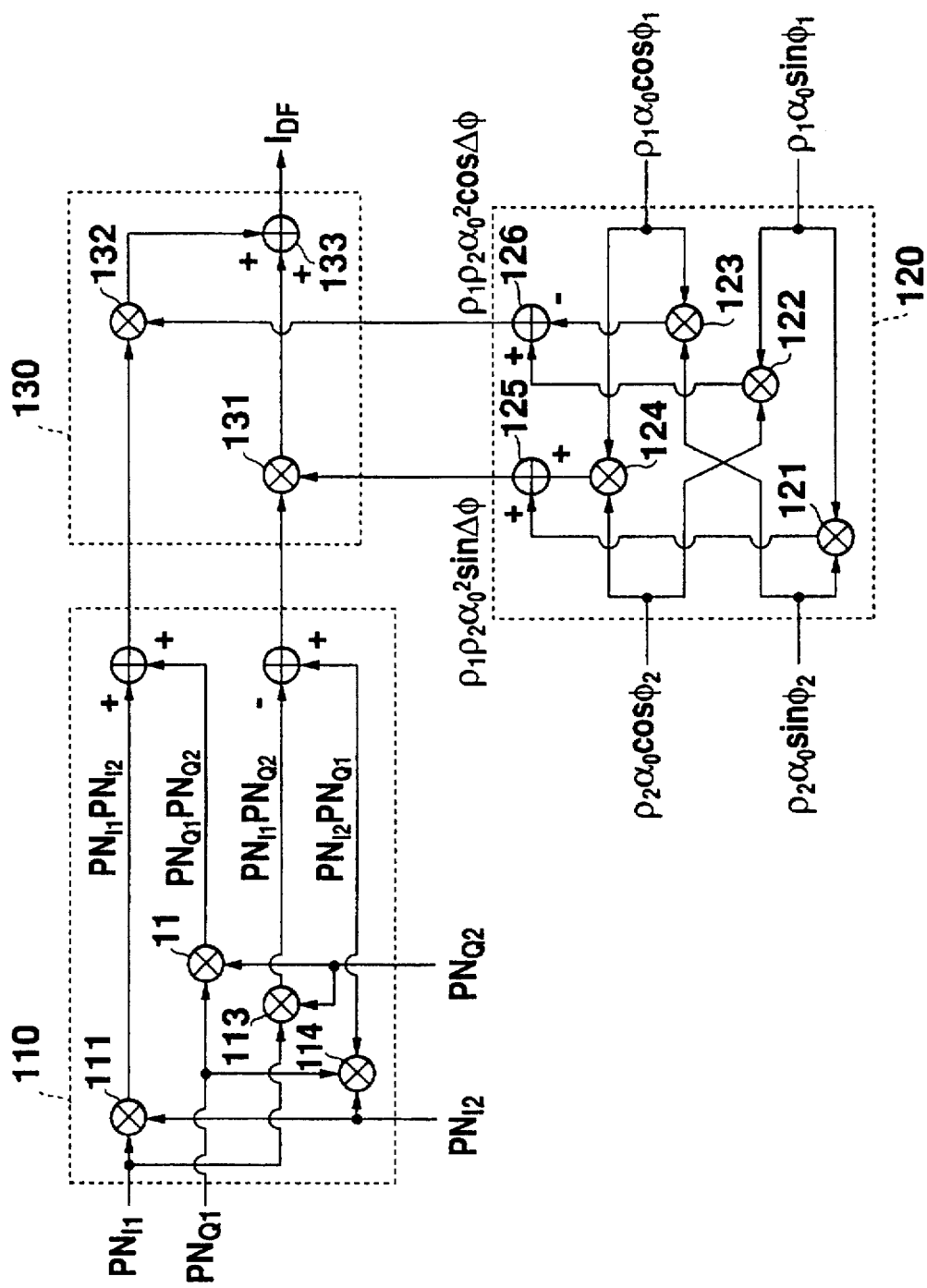
FIG. 13 is a configurational diagram of an interference amount calculating section.

It is thus possible from the above to find $I_{DF}$ by the interference amount calculation means depicted in FIG. 13. Although FIG. 13 illustrates a mathematical operation for deriving $I_{DF}$ from the respective components described above, the same effects may be presented by a software calculation.

Embodiment 10

Figure 14:
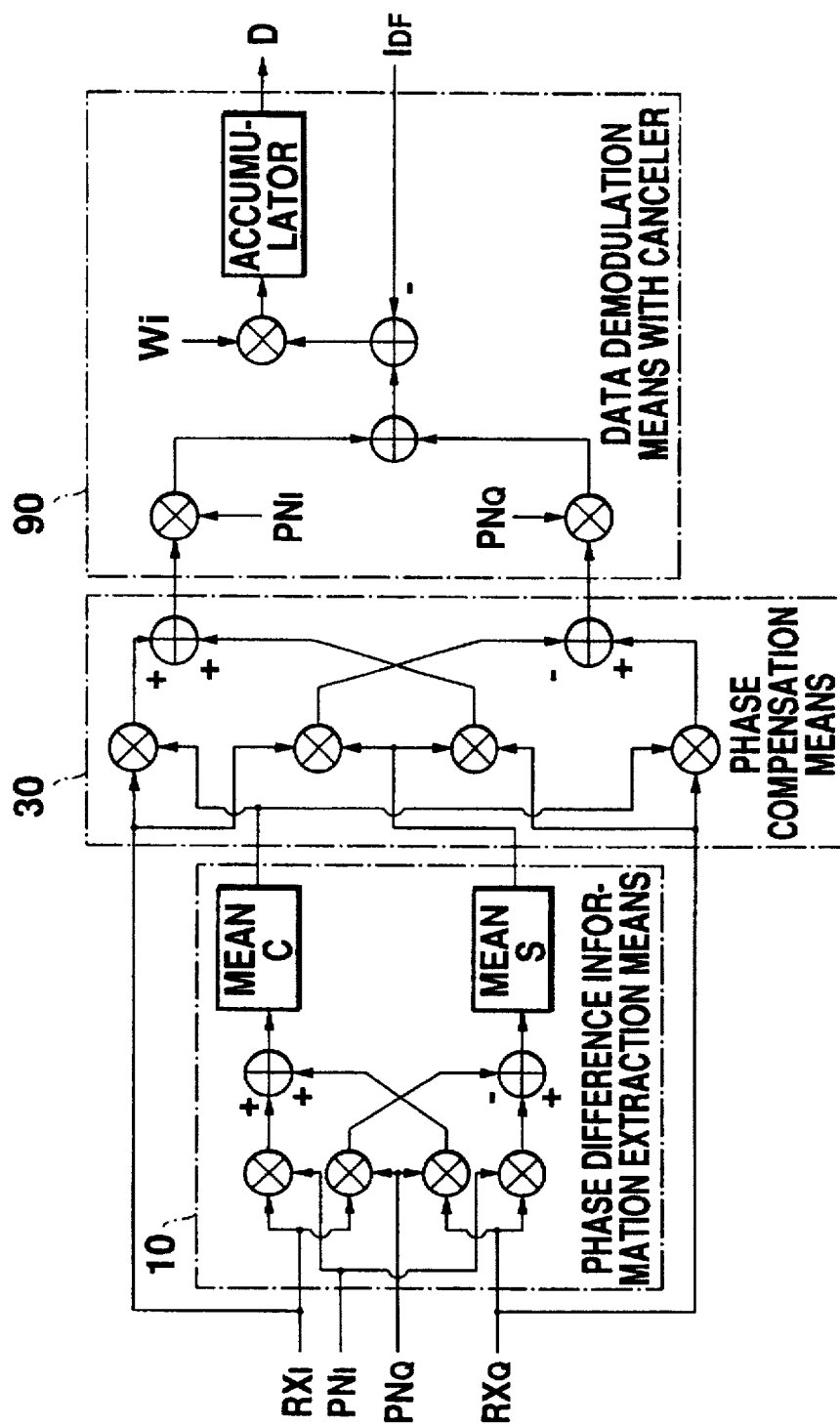
FIG. 14 is a configurational diagram of a data demodulator circuit in accordance with another embodiment of the present invention.

FIG. 14 depicts another embodiment of a data demodulator circuit configured in accordance with the present invention, differing from embodiment 9 in the point that it lacks the delay means 50 and 51. This is an arrangement taken when the carrier offset can be regarded as a phase offset $\theta$ with a sufficiently minute $\delta\phi$. The sufficiently minute $\delta\phi$ would occur in the case, for example, where the local oscillator has a good enough accuracy or $\delta\phi$ is corrected by other measures, leading to a reduction in size of the circuit.

Embodiment 11

Figure 15:
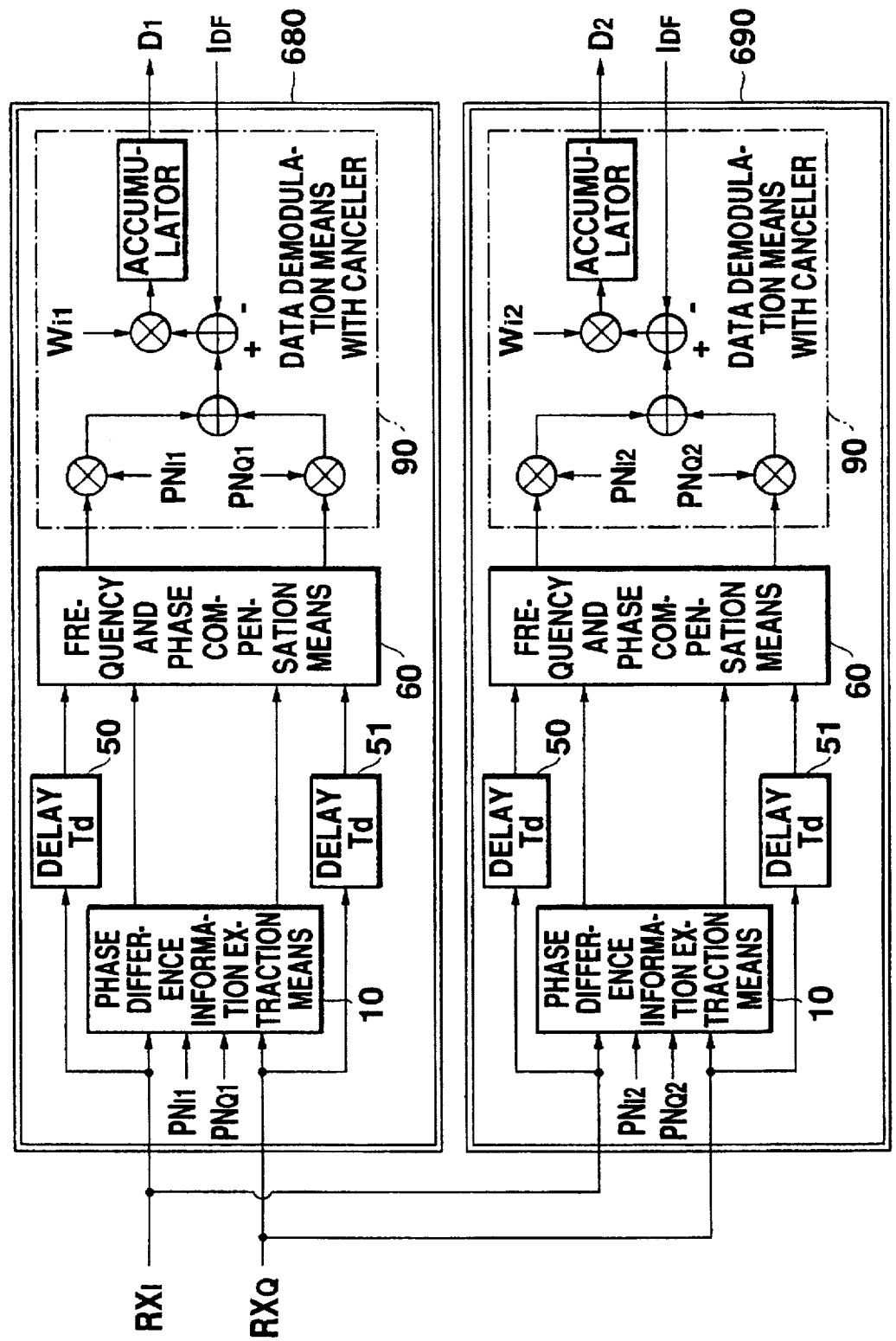
FIG. 15 depicts a configuration of a data demodulator in accordance with still another embodiment.

FIG. 15 depicts a configuration of still another embodiment of a data demodulator circuit in accordance with the present invention. Generally designated at 680 and 690 are respectively first and second data demodulator circuits acting on, respectively, forward wave and delay wave. The actions of the data demodulator circuits 680 and 690 are substantially the same as those in the embodiment 9. More specifically, $\rho_1\alpha_0 \cos \phi_1$ and $\rho_1\alpha_0 \sin \phi_1$ of FIG. 13 are given by a phase difference information extraction means of the circuit 680, whereas $\rho_2\alpha_0 \cos \phi_2$ and $\rho_2\alpha_0 \sin \phi_2$ are given by a phase difference information extraction means of the circuit 690. In the same manner, $PN_{I1}$ and $PN_{Q1}$ are delivered from a timing regenerating system of the circuit 680 while $PN_{I2}$ and $PN_{Q2}$ are delivered from a timing regenerating system of the circuit 690. Output $D_1$ and $D_2$, respectively, of the data demodulator circuits 680 and 690 include respective pilot signal interference canceled, with the result that use of the diversity combiner circuit depicted in FIG. 4 will allow a further improvement in demodulating characteristics by a simple configuration, as compared with the embodiment 4, in response to powers of the pilot signals contained in the received path signals having different timing.

Embodiment 12

Figure 16:
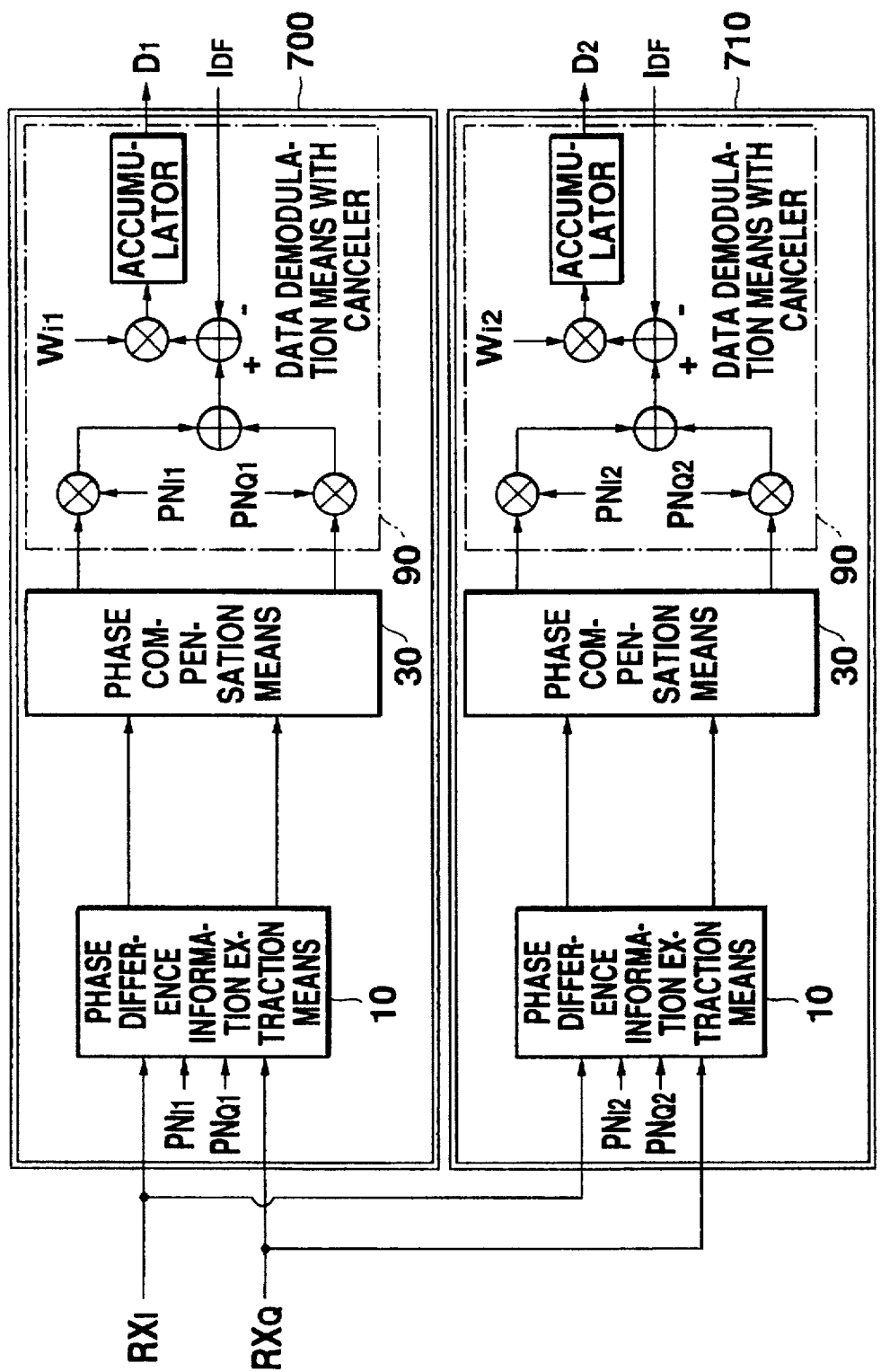
FIG. 16 depicts a configuration of a data demodulator in accordance with yet another embodiment.

FIG. 16 depicts yet another embodiment of a data demodulator circuit configured in accordance with the present invention, differing from embodiment 11 in the exclusion of delay means 50 and 51. This is an arrangement available when the carrier offset can be regarded as a phase offset θ with a sufficiently minute δφ. The sufficiently minute δφ would occur in the case, for example, where the local oscillator has a good enough accuracy or δφ is corrected by other measures, leading to a reduction in size of the circuit.

Embodiment 13

Figure 17:
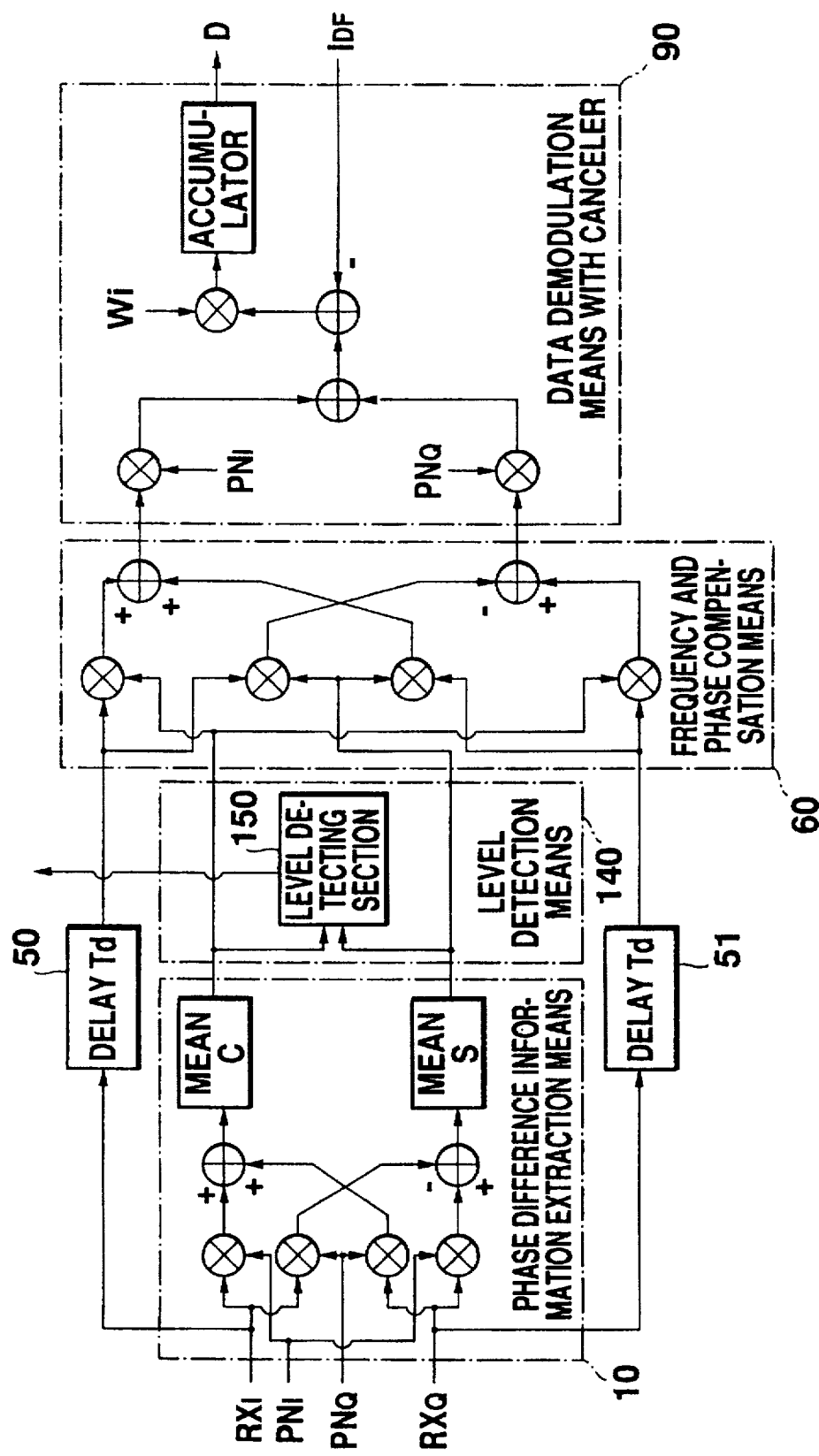
FIG. 17 illustrates a data demodulator circuit configured in accordance with yet still another embodiment.

FIG. 17 is a diagram showing yet another embodiment of a data demodulator circuit in accordance with the present invention, which differs from FIG. 12 depicting embodiment 9 in the point that it includes a level detection means 140 between a phase difference extraction means 10 and a frequency and phase compensation means 60. An interference amount calculation means in this embodiment has a configuration depicted in FIG. 19, being different from FIG. 13 illustrating embodiment 9 in the point that it further includes a control section 160 and a selector 200. Although the elimination of interference can be accomplished when the influence of noise has been satisfactorily reduced at the output of the phase difference extraction means 10, a lower signal level, for example, would increase the influence of the noise and the output of the phase difference information extraction means 10 may be more greatly affected by the noise. Since, in such an instance, an interference amount obtained by the interference amount calculation means is also being greater influenced by the noise, a subtraction of IDF in an adder 92 of FIG. 17 might possibly cause a deterioration in the receiving characteristics.

Figure 18:
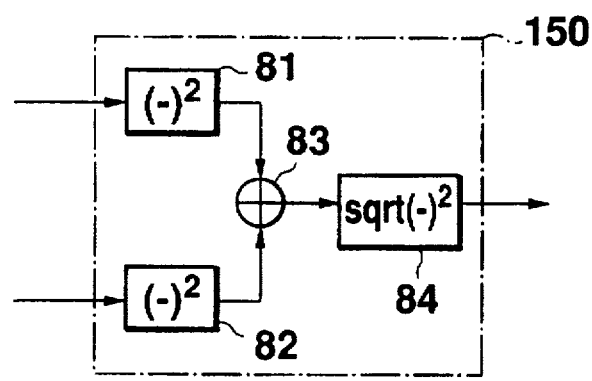
FIG. 18 illustrates a configuration of a level detector.
Figure 19:
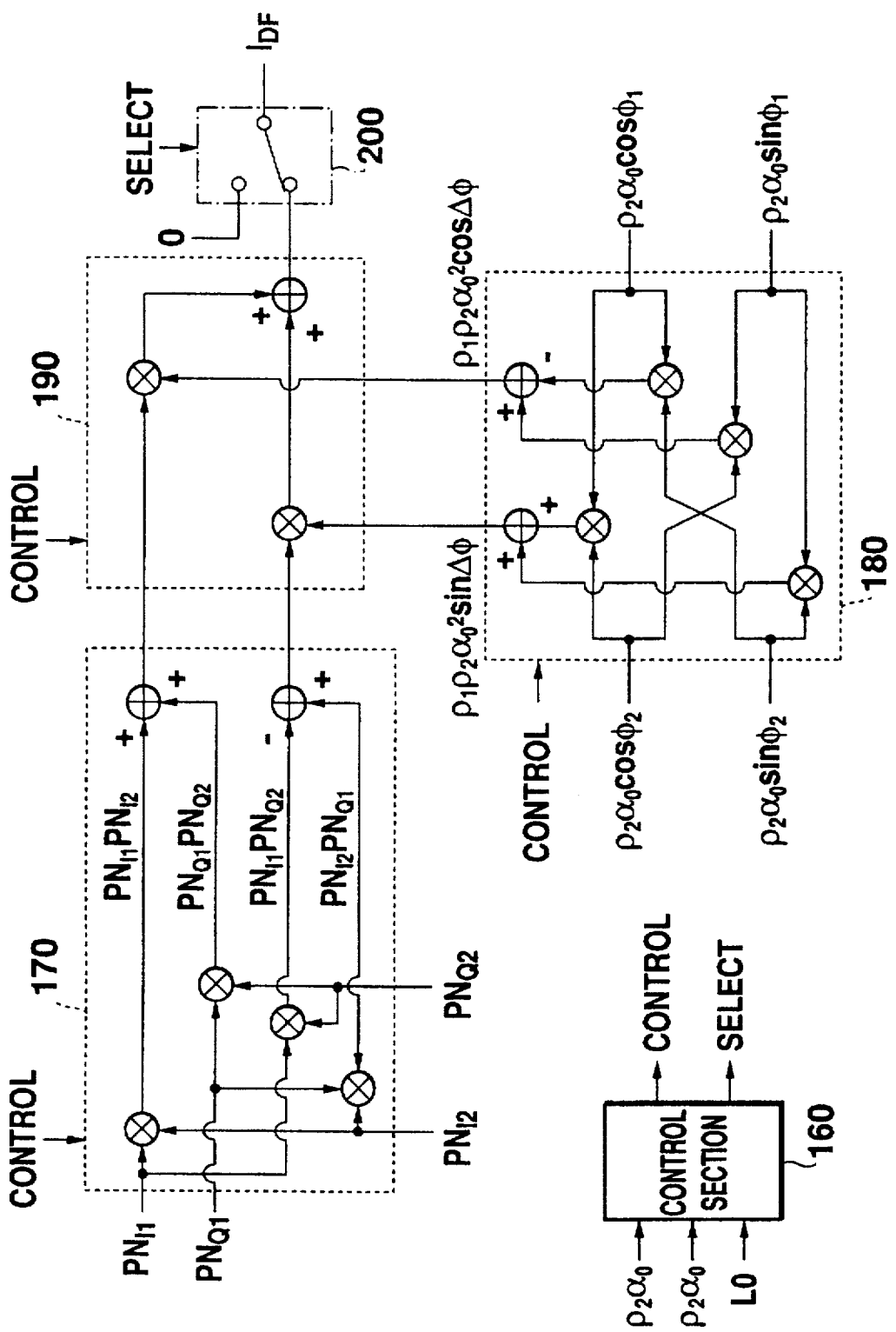
FIG. 19 is a configurational diagram of another interference amount calculating section.

In order to prevent such deterioration in the receiving characteristics, input to the control section 160 of FIG. 19 is a level detected by the level detecting means 140. Then, if either one of detection levels $\rho_1\alpha_0$ and $\rho_2\alpha_0$ of the data demodulator circuits acting on the forward wave and the delay wave, respectively, drops below a threshold level ($L_O$) simultaneously input to the control section, control signals are issued from the control section to multipliers and adder/subtracters of sections 170, 180 and 190, so as to stop the arithmetic operations. The stopping of arithmetic operations will result in a reduction of power consumption. At the same time, the selector 200 receives a select signal, thereby permitting the interference amount calculation means to output $I_{DF}$=0. If $I_{DF}$=0 is provided as input to the adder 91, then the canceling action will be effectively ceased to allow a prevention of deterioration in characteristics. Referring to FIG. 18, shown is a detailed configuration of a level detector 150 devoted to level detection and including only a sum-squaring means and a square root calculation means.

Embodiment 14

Figure 20:
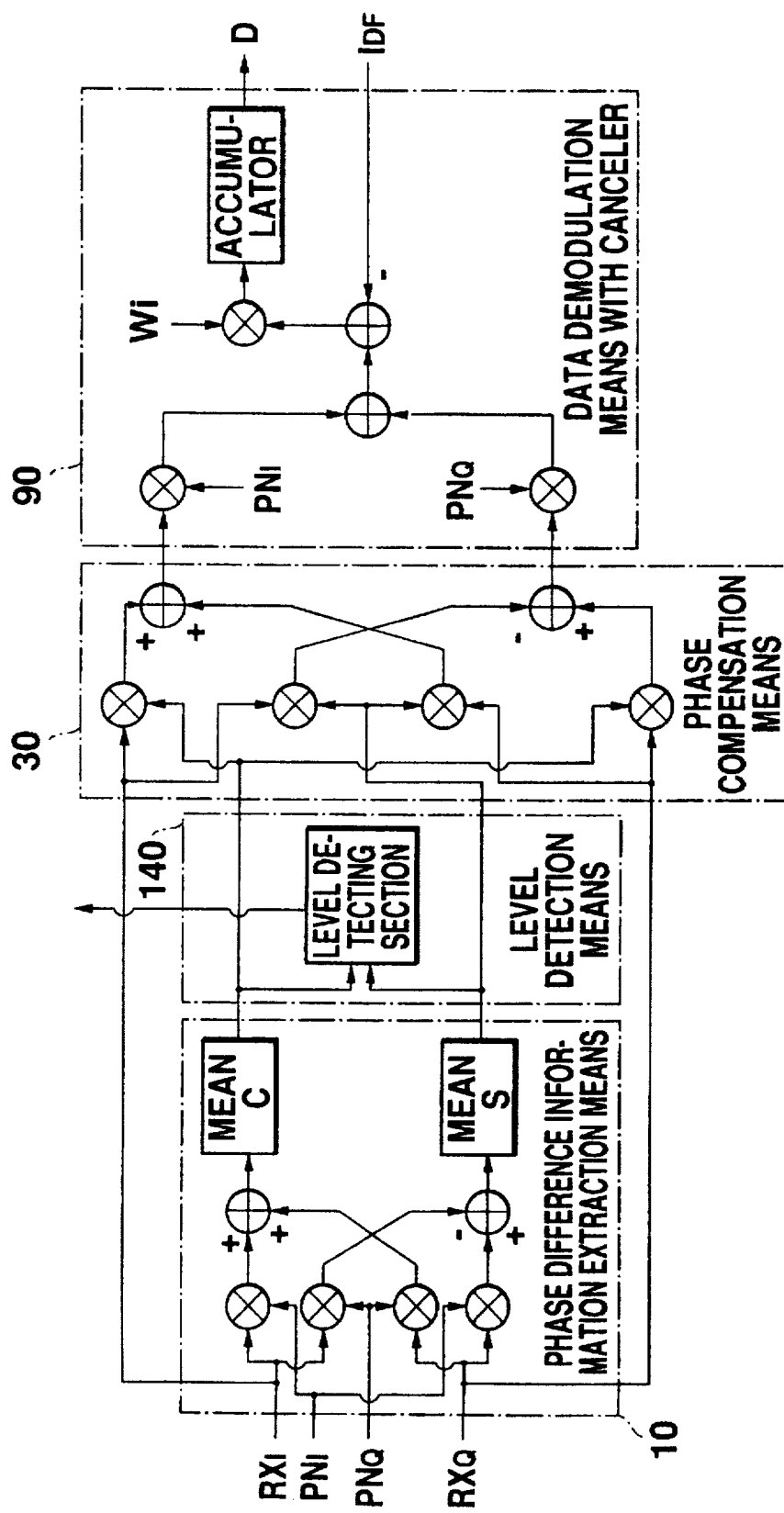
FIG. 20 is a configurational diagram of a data demodulator circuit in accordance with a further embodiment.

FIG. 20 depicts a further embodiment of a data demodulator circuit in accordance with the present invention, differing from the embodiment 13 in the point that the delay means 50 and 51 are excluded therefrom. This arrangement is available when the carrier offset can be regarded as a phase offset θ with a sufficiently minute δφ. The sufficiently minute δφ would occur, for example, when the local oscillator has a good enough accuracy or when δφ is corrected by other measures, leading to a reduction in size of the circuit.

Embodiment 15

Figure 21:
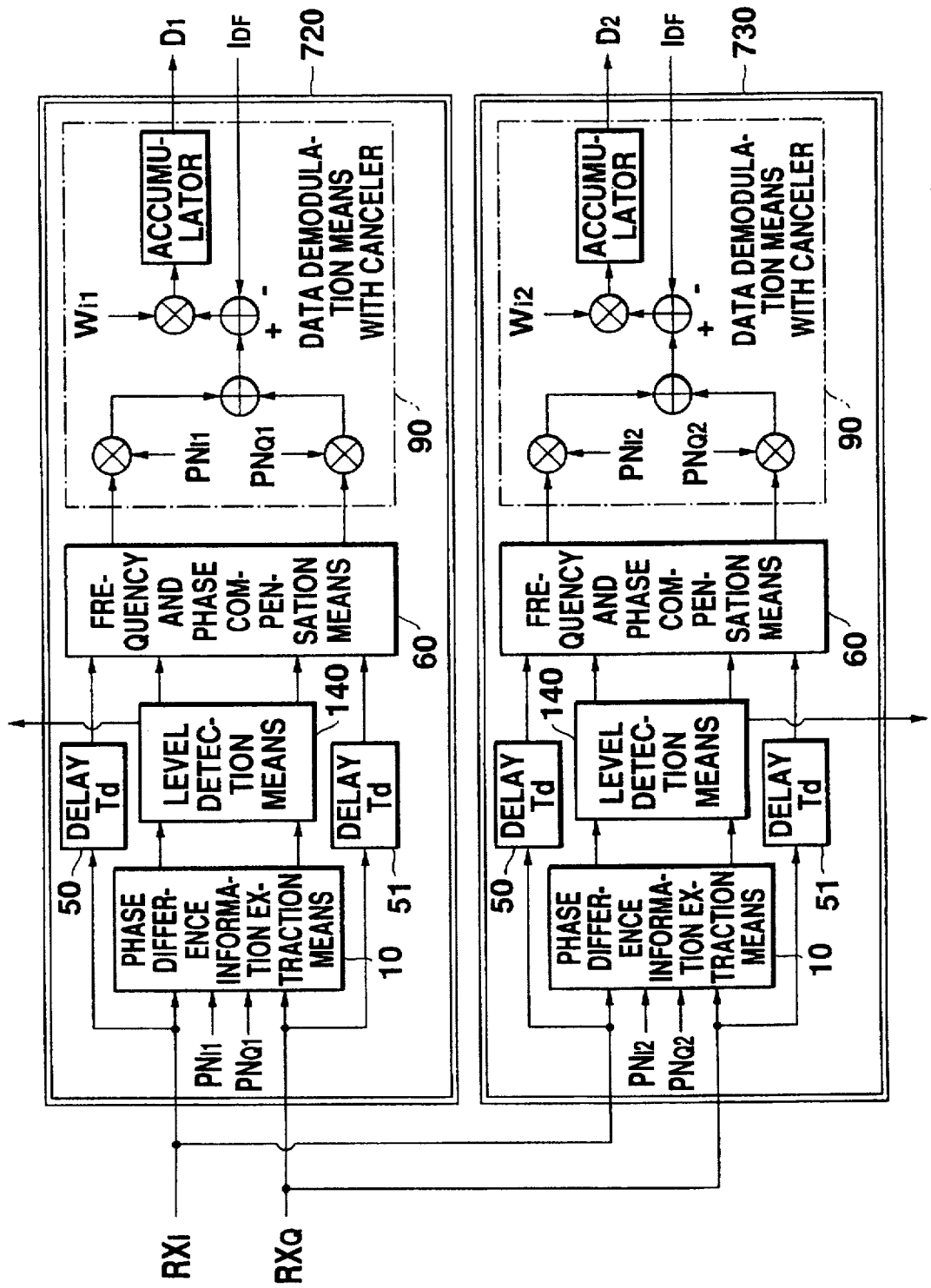
FIG. 21 depicts a configuration of a data demodulator circuit in accordance with a still further embodiment.

FIG. 21 depicts a still further embodiment of a data demodulator circuit configured with the present invention. Generally designated at 720 and 730 are data demodulator circuits which operate on forward wave and delay wave, respectively, and whose actions are substantially the same as the embodiment 13. More specifically, $\rho_1\alpha_0 \cos \phi_1$ and $\rho_1\alpha_0 \sin \phi_1$ of FIG. 19 are supplied from a phase difference information extraction means constituting the circuit 720, while $\rho_2\alpha_0 \cos \phi_2$ and $\rho_2\alpha_0 \sin \phi_2$ are supplied from a phase difference information extraction means constituting the circuit 730. Similarly, $PN_{I1}$ and $PN_{Q1}$ are delivered from a timing regenerating system associated with the circuit 720, while $PN_{I2}$ and $PN_{Q2}$ are delivered from a timing regenerating system associated with the circuit 730. $\rho_1\alpha_0$ and $\rho_2\alpha_0$ are respectively fed from level detecting means of the circuits 720 and 730. A threshold level $L_O$ is appropriately determined from a received S/N ratio, the magnitude of $\alpha_0$, etc., in consideration of a value that may not be expected the removal of interference. The outputs of the data demodulator circuits 720 and 730 are provided to the diversity combiner circuit of FIG. 4 whereby in addition to executing the action of FIG. 15 depicting the embodiment 11 a canceling action is ceased if either received path signal level is small, to prevent the canceling action from conversely causing a deterioration in the data demodulating characteristics.

Embodiment 16

Figure 22:
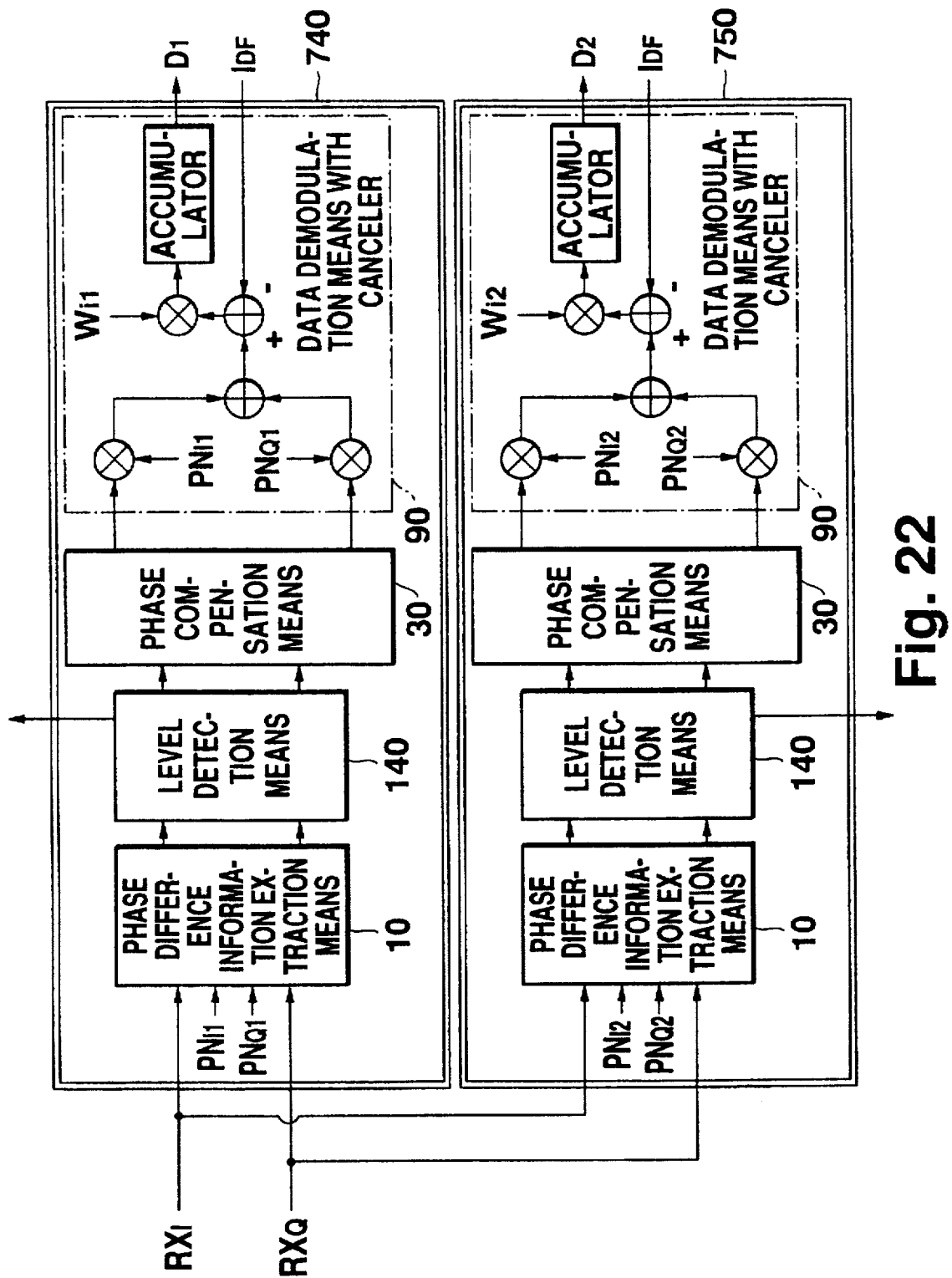
FIG. 22 depicts a configuration of a data demodulator circuit in accordance with a yet further embodiment.

FIG. 22 depicts a yet further embodiment of a data demodulator circuit configured in accordance with the present invention, which differs from the embodiment 15 in the point that it includes no delay means 50 and 51. This arrangement is available when the carrier offset can be regarded as a phase offset θ with a sufficiently minute δφ. The sufficiently minute δφ would occur in the case, for example, where the local oscillator has a good enough accuracy or δφ is corrected by other measures, leading to a reduction in size of the circuit.

Embodiment 17

Figure 23:
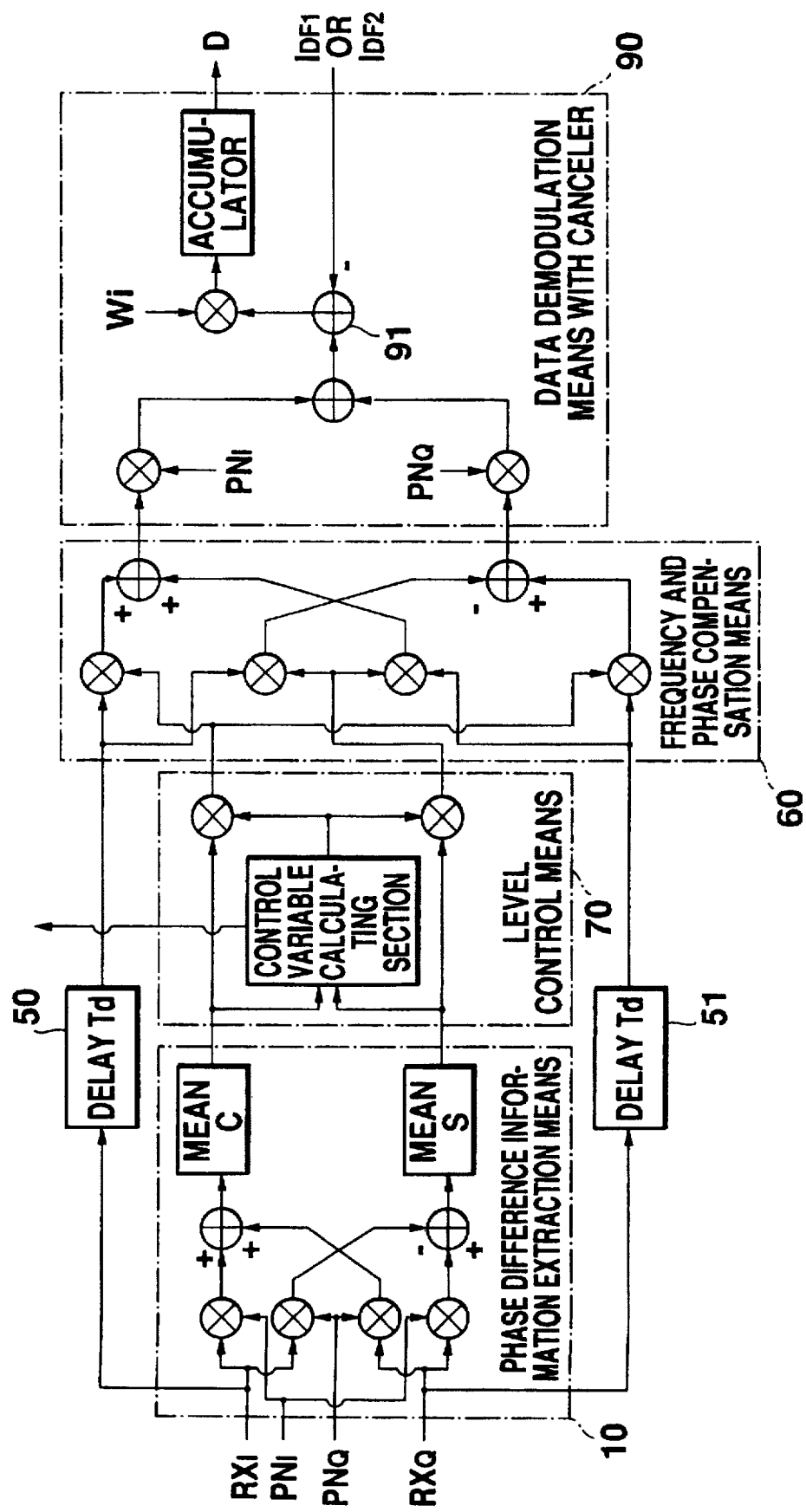
FIG. 23 illustrates a data demodulator circuit configured in accordance with a yet still further embodiment.

FIG. 23 is a diagram depicting a configuration of a still further embodiment of a data demodulator circuit in accordance with the present invention. In addition to the configuration depicted in FIG. 7 indicative of the embodiment 5, this embodiment is arranged to include an interference amount calculation means illustrated in FIG. 24 by which the amounts $I_{DF1}$ or $I_{DF2}$ of interference are eliminated through an adder 91 constituting a data demodulation means 90 with canceler. $I_{DF1}$ is input when the circuit shown in FIG. 23 acts on forward wave, whereas $I_{DF2}$ is input when it acts on delay wave. Namely, when the data demodulator circuit includes a level control means, the Interference amount $I_{DF1}$ and $I_{DF2}$ may result in different values from those in FIG. 12 depicting the embodiment 9 not including level control means. Nevertheless, as long as it is noted that the outputs of the level control means with respect to RX (t) are not $\rho_1\alpha_0 \exp(-j\phi_1)$ and $\rho_2\alpha_0 \exp(-j\phi_2)$, respectively, m but $\exp(-j\phi_1)$ and $\exp(-j\phi_2)$, respectively, $I_{DF1}$ and $I_{DF2}$ will simply obtained from the method illustrated in the embodiment 9

$$I_{DF1}=\rho_2\alpha_0\{PN_{f2} \cos \Delta\phi - PN_{Q2} \sin \Delta\phi\}*PN_{f1}\rho_1\alpha_0\{PN_{Q2} \cos \Delta\phi + PN_{f2} \sin \Delta\phi\}*PN_{Q2}$$

$$I_{DF2}=\rho_1\alpha_0\{PN_{f2} \cos \Delta\phi - PN_{Q2} \sin \Delta\phi\}*PN_{f1}\rho_1\alpha_0\{PN_{Q2} \cos \Delta\phi + PN_{f2} \sin \Delta\phi\}*PN_{Q2}$$

Figure 24:
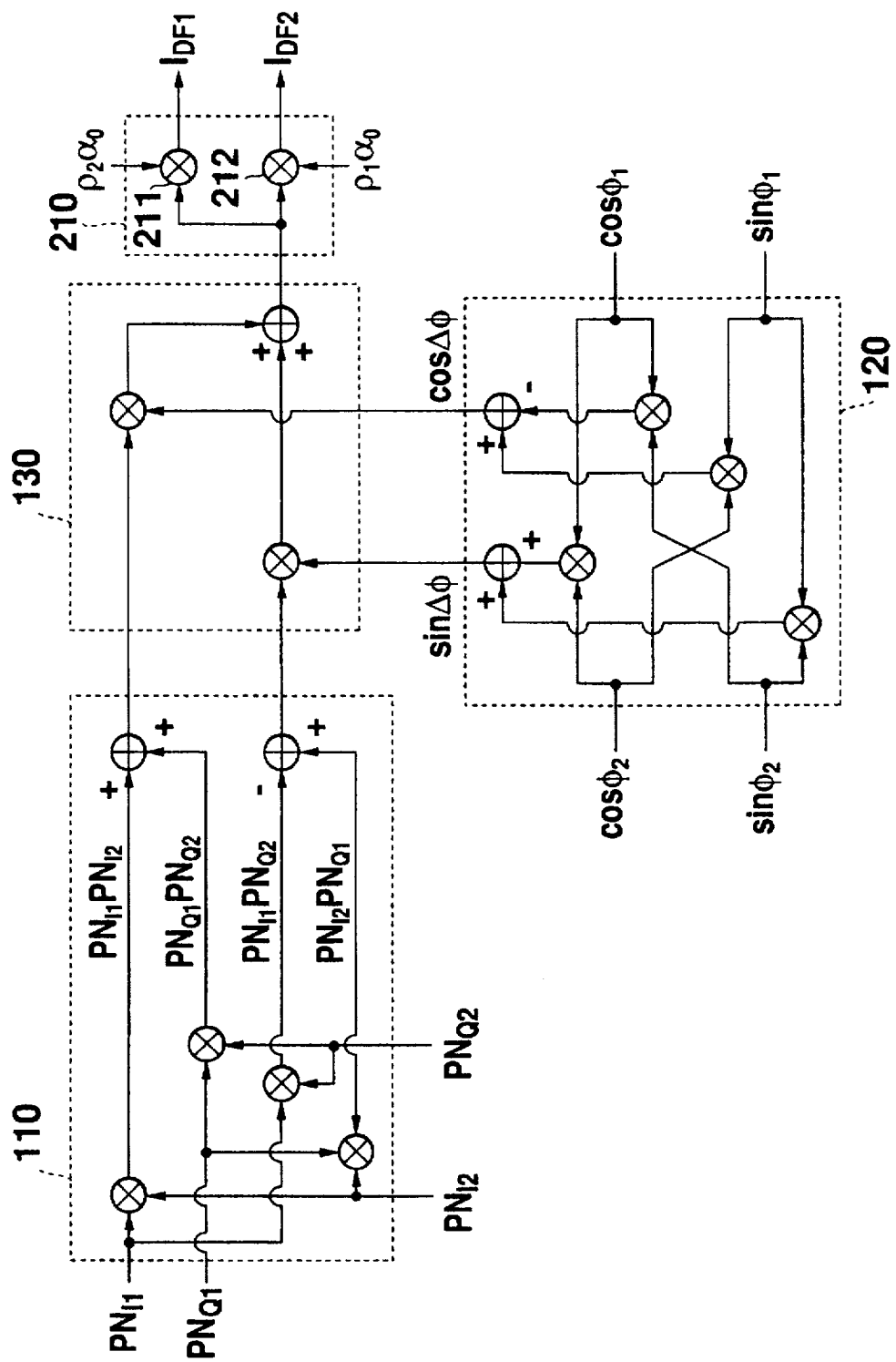
FIG. 24 illustrates a configuration of a further interference amount calculating section.

It is thus possible to find $I_{DF1}$ and $I_{DF2}$ by the interference amount calculation means depicted in FIG. 24. Although FIG. 24 illustrates a mathematical operation for deriving $I_{DF1}$ and $I_{DF2}$ from the respective components described above, the same effects may be presented by a software calculation.

Embodiment 18

Figure 25:
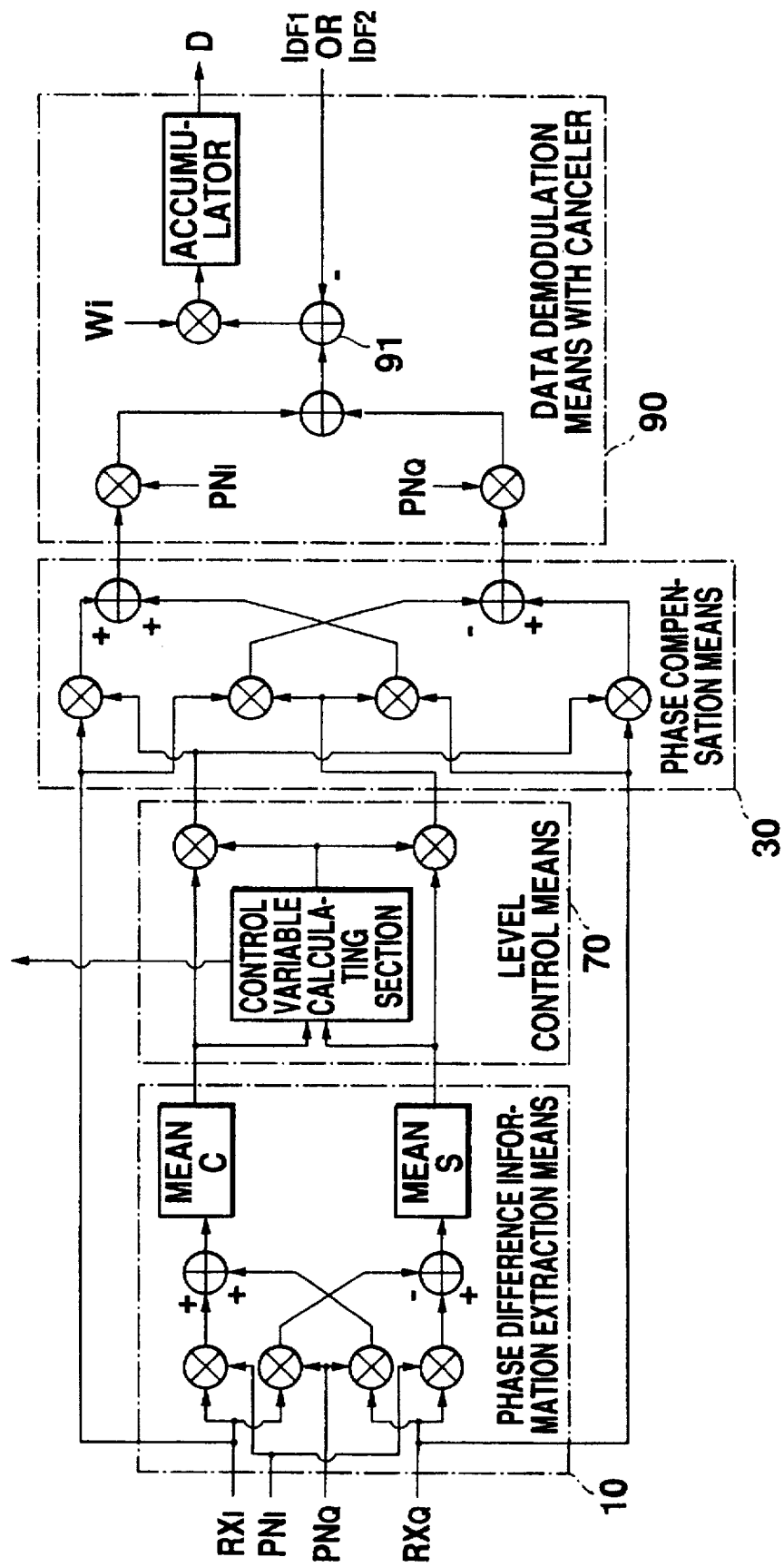
FIG. 25 is a configurational diagram of a data demodulator circuit in accordance with another embodiment of the present invention.

FIG. 25 depicts another embodiment of a data demodulator circuit in accordance with the present invention, differing from embodiment 17 in the point that it does not include the delay means 50 and 51. This is an arrangement available when the carrier offset can be regarded as a phase offset θ with a sufficiently minute δφ. The sufficiently minute δφ would occur in the case, where the local oscillator has a good enough accuracy or δφ is corrected by other measures, leading to a reduction in size of the circuit.

Embodiment 19

Figure 26:
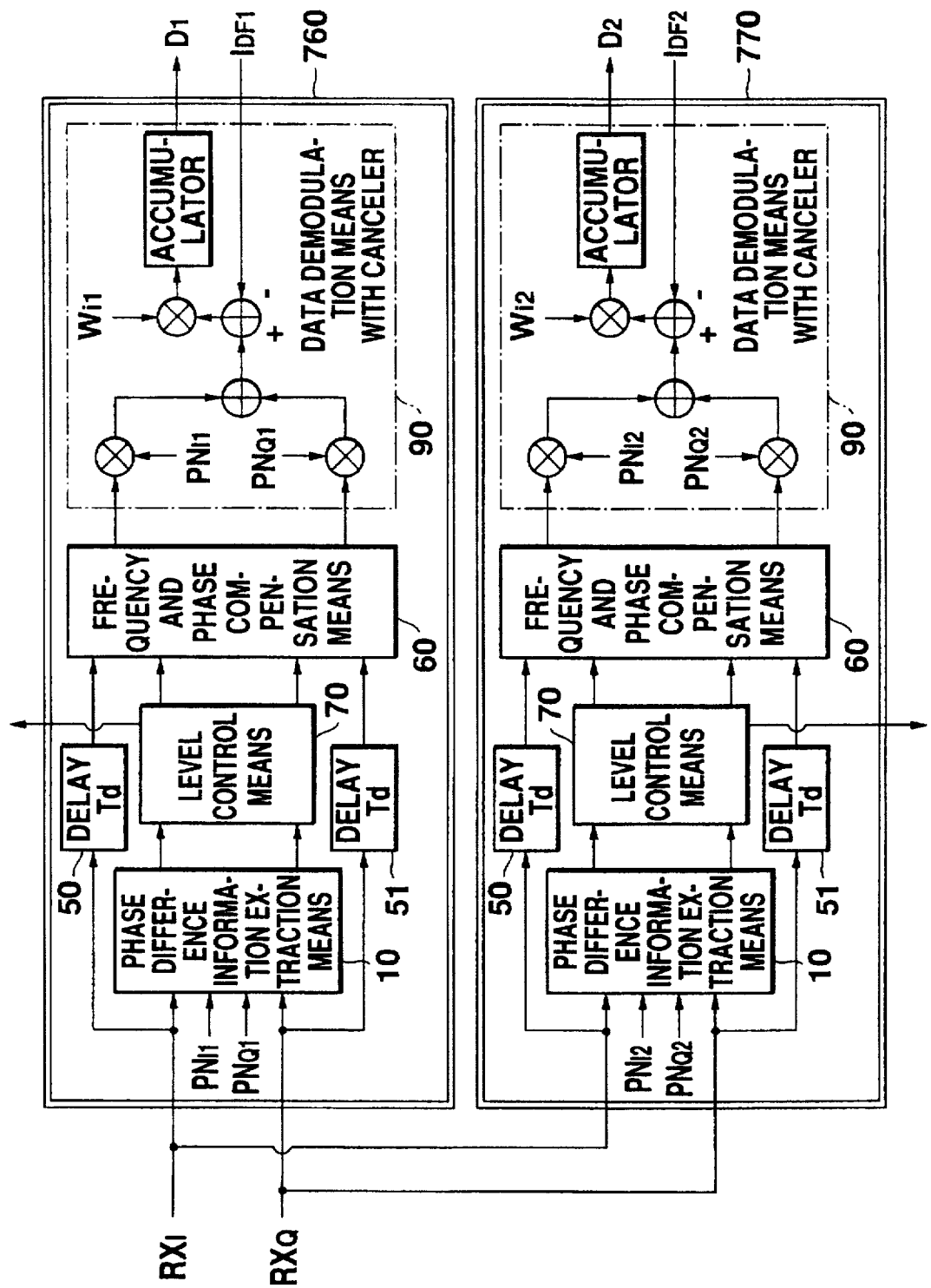
FIG. 26 is a configurational diagram of a data demodulator circuit in accordance with a further embodiment.

FIG. 26 depicts a configuration of a further embodiment of a data demodulator circuit in accordance with the present invention. This embodiment includes data demodulator circuits 760 and 770 which are allowed to act on forward wave and delay wave, respectively, and whose actions are substantially the same as the embodiment 17. More specifically, a level control means of the circuit 760 issues $\cos\phi_1$ and $\sin\phi_1$ of FIG. 24, while a level control means of the circuit 770 issues $\cos\phi_2$ and $\sin\phi_2$. In the same manner, a timing regenerating system associated with the demodulator circuit 760 issues $PN_{I1}$ and $PN_{Q1}$, while a timing regenerating system associated with the circuit 770 issues $PN_{I2}$ and $PN_{Q2}$. Also, $\rho_1\alpha_0$ and $\rho_2\alpha_0$ are respectively obtained by controlled variable calculating sections within the level control means constituting the circuits 760 and 770. Shown in FIG. 8 is a configuration of the controlled variable calculating sections. The outputs of the data demodulator circuits are provided as inputs to a diversity combiner depicted in FIG. 27 to implement a maximal ratio combining diversity reception.

Thus, the configuration of FIG. 23 or FIG. 26 will ensure for the use of a level controlled frequency and phase compensation means that demodulating characteristics are improved by finding the amount of interference caused by pilot signals with different timing and canceling it within the data demodulator means with a canceler. Consequently, with a lower number of quantized bits, effective action will be ensured on the carrier offset and on the interference arising from the pilot signals with different timing, resulting in the implementation of a preferred maximal ratio combining diversity reception.

Embodiment 20

Figure 28:
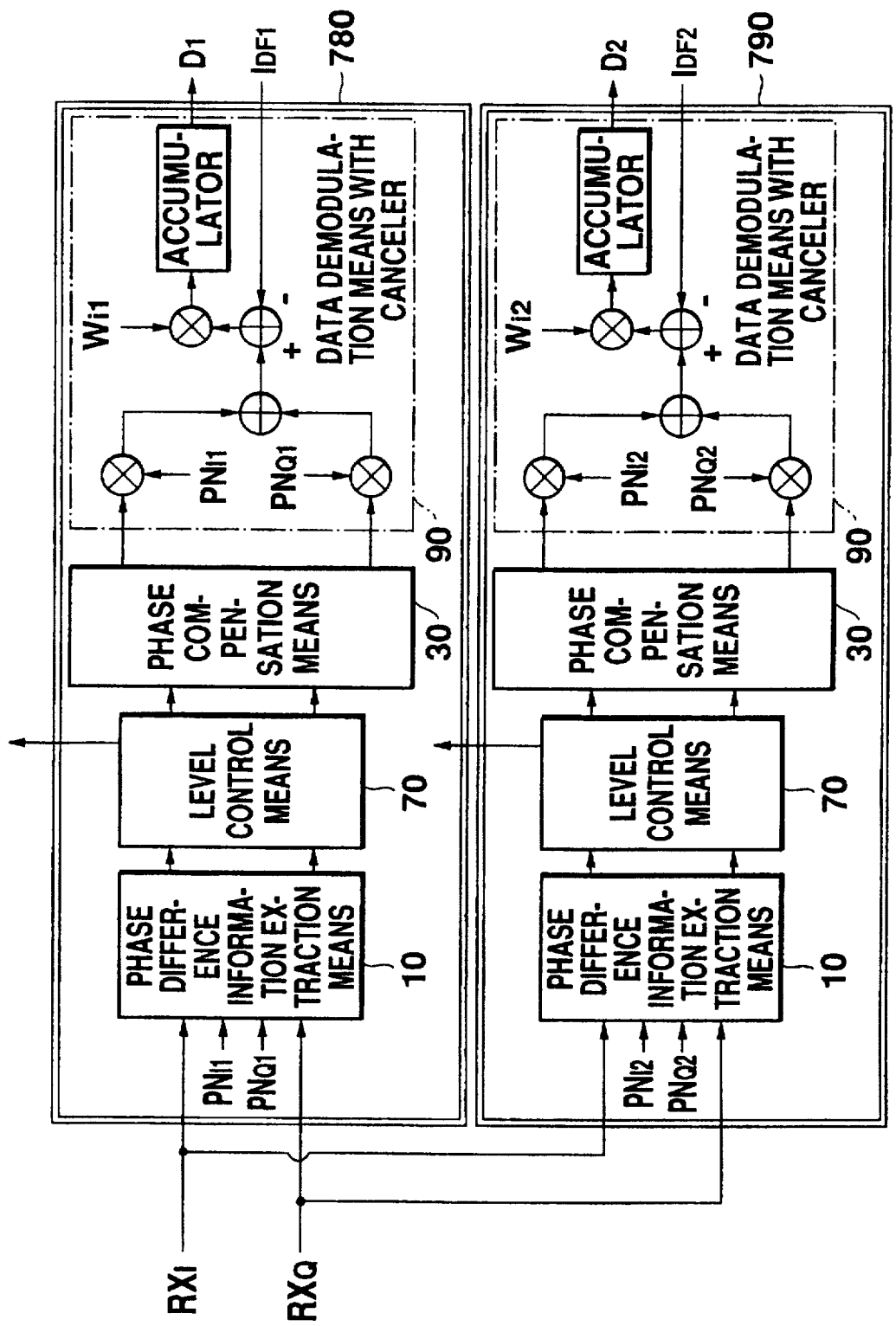
FIG. 28 depicts a configuration of a data demodulator circuit in accordance with still another embodiment.

FIG. 28 depicts still another embodiment of a data demodulator circuit in accordance with the present invention, differing from the embodiment 19 in the point that the delay means 50 and 51 are excluded therefrom. This arrangement is permitted to be employed when the carrier offset can be regarded as a phase offset θ with a sufficiently minute δφ. The sufficiently minute δφ would occur when, for example, the local oscillator has a good enough accuracy or δφ is corrected by other measures, contributing to a reduction in size of the circuit.

Embodiment 21

Figure 29:
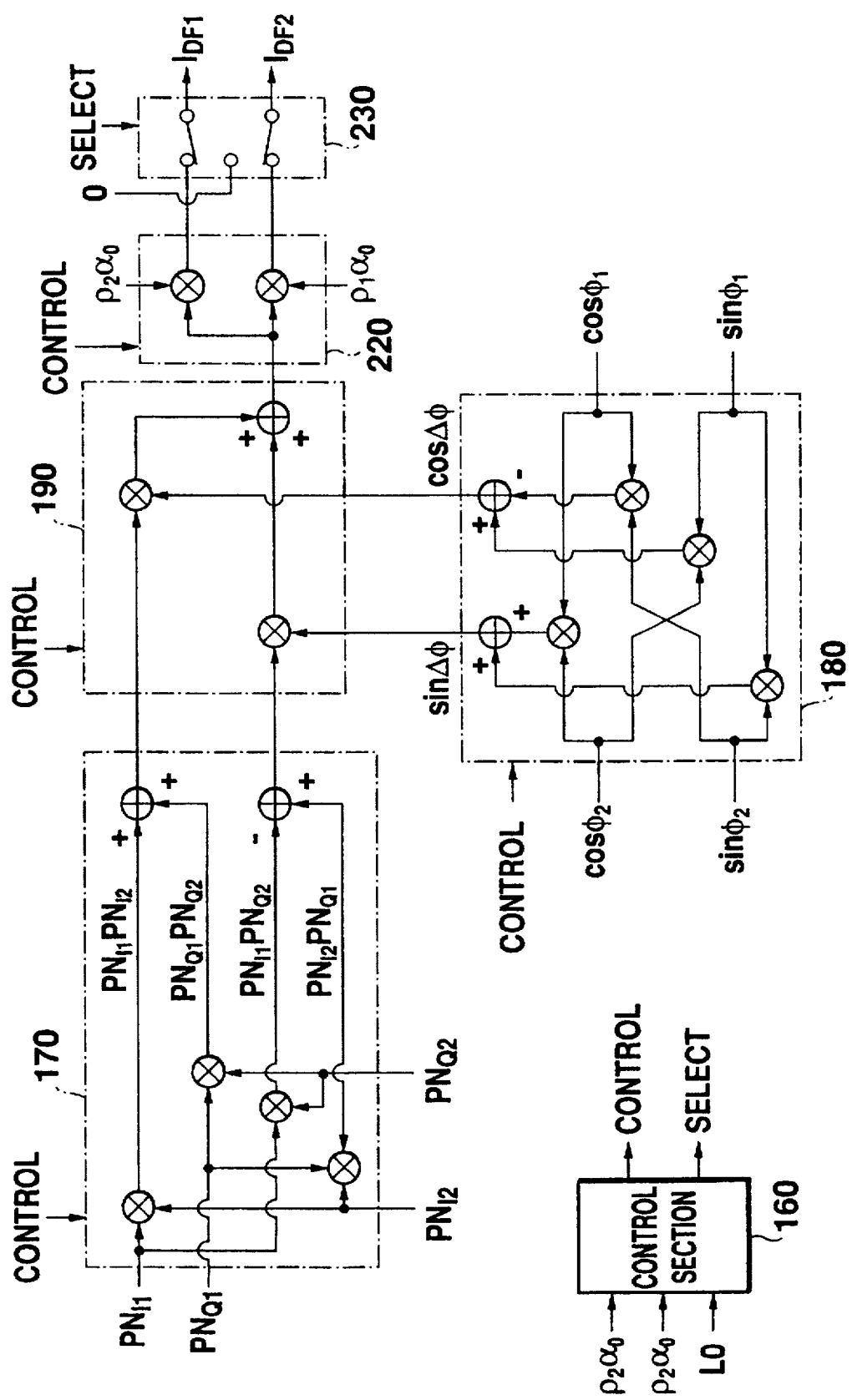
FIG. 29 illustrates a configuration of still another interference amount calculating section.

FIG. 23 depicts a configuration of a still further embodiment of a data demodulator circuit in accordance with the present invention. The relationship between the embodiments 17 and 21 will be similar to that established between the embodiments 9 and 13. Namely, the embodiment 21 aims to provide a data demodulator circuit allowing a prevention of degradation in characteristics, by effectively ceasing a canceling action in the case where the canceling action may adversely degrade the reception characteristics, in response to a level obtained by the level control means of the embodiment 19. Thus, an interference amount calculation means depicted in FIG. 29 is used. The interference amount calculation means of FIG. 29 is comprised of the interference amount calculation means of FIG. 24 with an additional control section 160 and selector 230. The control section 160 issues control signals to multiplier-adder-subtracter sections 170, 180, 190 and 220 to thereby put the operation to a stop if either detection level drops below a threshold level ($L_0$), of detection levels $\rho_1\alpha_0$ and $\rho_2\alpha_0$ derived from the controlled variable calculating sections within the level control means. At the same time, the control section 160 issues a select signal to the selector 230, allowing $I_{DF1}$, $I_{DF2}=0$ to be output for the effective stop of the canceling action, to thereby prevent a degradation in characteristics.

A threshold level $L_0$ is appropriately determined from a received S/N ratio, the magnitude of $\alpha_0$, etc., in consideration of a value that may not be expected the removal of interference.

Embodiment 22

FIGS. 25 and 29 depict yet another embodiment of a data demodulator circuit configured in accordance with the present invention and differing from the embodiment 21 in the point that delay means 50 and 51 are not included. This is an arrangement available when the carrier offset can be regarded as a phase offset θ with a sufficiently minute δφ. The sufficiently minute δφ would occur in the case, for example, where the local oscillator has a good enough accuracy or δφ is corrected by other means, leading to a reduction in size of the circuit.

Embodiment 23

FIG. 26 is a configurative diagram depicting a yet further embodiment of a data demodulator circuit in accordance with the present invention. The configuration of interference amount calculation means used in first and second data demodulator circuits 760 and 770 is the same as FIG. 29, and the actions of the data demodulator circuits is the same as the embodiment 21. Thus, the outputs of the data demodulator circuits are provided to the diversity combiner circuit depicted in FIG. 27 so as to eliminate the influence of the carrier offset irrespective of a lower number of bits and to cancel the influence of the interference arising from pilot signals with different timing and further to prevent the canceling action from causing a degradation in characteristics when the received path signal is a low level.

Embodiment 24

FIG. 28 also depicts a yet further embodiment of a data demodulator circuit configured with the present invention, which differs from the embodiment 23 in the point that it does not include the delay means 50 and 51. This arrangement is available if the carrier offset can be regarded as a phase offset θ with a sufficiently minute δφ. The sufficiently minute δφ would occur when, for example, the local oscillator has a good enough accuracy or δφ is corrected by other means, leading to a reduction in size of the circuit.

Although in the above-described embodiments describes for only two received paths, associated with forward wave and delay wave, the same configuration is applicable when there are three or more paths having a greater strength by calculating the amount of interference to remove the influence of interference caused by pilot signals with different timing. More specifically, it is possible for the data demodulator circuit acting on a first path signal to eliminate the interference, by calculating the amount of interference arising from a pilot signal contained in a second path signal and the amount of interference arising from a pilot signal contained in a third path signal individually with the respective interference amount calculation means, in the same manner as the methods disclosed in the above embodiments, and then providing the results as input to the adder 91 of the demodulator circuit acting on the first path signal.

The same can be said of the data demodulator circuits acting on second and third path signals, respectively.

In the case of that the total number of the data demodulator circuits is limited, it is possible for data demodulator circuits to remove the interference due to the pilot signals contained in the received path signal without allocating demodulator circuits, by calculating the amount of interference, and providing the result, as input to the adder 19, by use of the interference amount calculation means corresponding to the respective embodiments. Because it is possible to obtain components necessary for the calculation of the interference amount, by setting up such as a pseudo noise code timing regenerating means (the embodiments 5 to 12), a phase difference information extraction means 10 (embodiments 5 to 12), a level detecting means 140 (embodiments 7 and 8), and a level control means 70 (embodiments 9 to 12). Although disclosed in this specification is a data demodulator circuit for spread spectrum modulated signals with respect to two axes consisting of the in-phase axis and the quadrature axis (QPSK spread spectrum signals), the omission of a processing system associated with the quadrature axis spread symbols would allow the data demodulator circuit to present substantially the same effects for spread spectrum modulated signals only with respect to the in-phase axis. The action in this case will be easy to understand, assuming that $PN_Q$, $PN_{Q1}$ and $PN_{Q2}$ equal to be zero over the contents disclosed in the specification.

According to a data demodulator circuit for spread spectrum communication of the present invention, as detailed in the above embodiments, an in-phase axis received signal and a quadrature axis received signal are respectively multiplied by an in-phase axis pseudo noise code and a quadrature axis pseudo noise code, the products being subjected to an addition or subtraction and then averaged, whereby a simple configuration will ensure an extraction of phase difference information having increased immunity to noise.

Also, as a frequency and phase compensation is operated on received signals delayed by a suitable period of time so as to allow the amount of phase rotation arising from a relative frequency deviation to be identical, thereby eliminating the influence arising from the frequency deviation by only use of the delay means without requiring any execution of such complicated processing as $\tan^{-1}$ arithmetic and phase rotation operations.

Further, the level control means allows the frequency and phase compensation to be carried out at a constant level, which will ensure an effective action in the case of a restricted number of quantized bits.

Furthermore, the interference amount calculation means and the data demodulation means with canceler serve in cooperation to remove the amount of interference caused by the pilot signals with different timing to improve the demodulating characteristics.

Also, the action of the interference amount calculation means is allowed to be controlled in response to the amount of the detection level, thereby preventing the degradation in characteristics which may be attendant on the removal of interference when the level is small.

Moreover, the maximal ratio combining diversity reception is performed by a diversity combiner circuit through a plurality of data demodulator circuits so as to ensure by a simple configuration a maximum ratio diversity receive action superior in characteristics including the above effects.

What is claimed is:

1. A data demodulator circuit for spread spectrum communication, demodulating data from received signal which is spread spectrum modulated with respect to the in-phase axis and the quadrature axis by a direct sequence technique with an in-phase axis pseudo noise code and a quadrature axis pseudo noise code, respectively, said data demodulator circuit comprising:

a phase difference information extraction means for extracting information of phase differences, by multiplying in-phase axis received signal and quadrature axis received signal with respective pseudo noise codes used on the transmitter side, taking addition or subtraction on two of the products in a predetermined combination, and averaging the results of the addition or subtraction;

a phase compensation means for compensating the effect of phase differences remaining in the in-phase axis received signal and the quadrature axis received signal, by use of the phase difference information obtained by said phase difference information extraction means; and a data demodulation means for demodulating transmitted data from the outputs of said phase compensation means.

2. A data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprising:

a plurality of data demodulator circuits with independent timing for spread spectrum communication according to claim 1;

a timing adjustment means adjusting the timing of the outputs of a plurality of said data demodulator circuits;

an adder means for adding the outputs of said timing adjustment means; and a data decision means for deciding the transmitted data from the output of said adder means.

3. A data demodulator circuit for spread spectrum communication, demodulating data from received signal which is spread spectrum modulated with respect to the in-phase axis and the quadrature axis by a direct sequence technique with an in-phase axis pseudo noise code and a quadrature axis pseudo noise code, respectively, said data demodulator circuit comprising:

a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition or subtraction;

a delay means for delaying the in-phase axis received signal and the quadrature axis received signal for a suitable period of time;

a frequency and phase compensation means for compensating the effect of frequency and phase offset remaining in the in-phase axis received signal and the quadrature axis received signal with time delayed by said delay means, by use of the phase difference information obtained by said phase difference information extraction means; and a data demodulation means for demodulating transmitted data from the outputs of said frequency and phase compensation means.

4. A data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprising:

a plurality of data demodulator circuits with independent timing for spread spectrum communication according to claim 3;

a timing adjustment means adjusting the timing of the outputs of a plurality of said data demodulator circuits;

an adder means for adding the outputs of said timing adjustment means; and a data decision means for deciding the transmitted data from the output of said adder means.

5. A data demodulator circuit for spread spectrum communication, demodulating data from received signal which is spread spectrum modulated with respect to the in-phase axis and the quadrature axis by a direct sequence technique with an in-phase axis pseudo noise code and a quadrature axis pseudo noise code, respectively, said data demodulator circuit comprising:

a phase difference information extraction means for extracting information of phase differences, by multiplying in-phase axis received signal and quadrature axis received signal by respective pseudo noise codes used on the transmitter side, taking addition or subtract on two of the products in a predetermined combination, and averaging the results of the addition or subtraction;

a delay means for delaying the in-phase axis received signal and the quadrature axis received signal for a suitable period of time;

a level control means for controlling the levels of the phase difference information obtained by said phase difference information extraction means;

a frequency and phase compensation means for compensating the effect of frequency and phase offset remaining in said time delayed in-phase axis received signal and quadrature axis received signal, by use of the phase difference information whose level has been controlled by said level control means; and a data demodulation means for demodulating transmitted data from the outputs of said frequency and phase compensation means.

6. A data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprising:

a plurality of data demodulator circuits with independent timing for spread spectrum communication according to claim 5;

a timing adjustment means adjusting the timing of the outputs of a plurality of said data demodulator circuits;

a level adjustment means for adjusting the levels of said outputs of said plurality of data demodulator circuits with timing adjusted by said timing adjustment means;

an adder means for adding the outputs of said level adjustment means; and a data decision means for deciding the transmitted data from output of said adder means.

7. A data demodulator circuit for spread spectrum communication, demodulating data from received signal which is spread spectrum modulated with respect to the in-phase axis and the quadrature axis by a direct sequence technique with an in-phase axis pseudo noise code and a quadrature axis pseudo noise code, respectively, said data demodulator circuit comprising:

a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition or subtraction;

a delay means for delaying the in-phase axis received signal and the quadrature axis received signal for a suitable period of time;

a frequency and phase compensation means for compensating the effect of frequency and phase offset remaining in said time delayed the in-phase axis received signal and the quadrature axis received signal with time delayed by said delay means, by use of the phase difference information obtained by said phase difference information extraction means;

an interference amount calculation means for calculating the amounts of interference effecting on the outputs of said frequency and phase compensation means due to pilot signals with different timing; and a data demodulation means with canceler for demodulating transmitted data from the outputs of said frequency and phase compensation means, while subtracting the interference amounts calculated by said interference amount calculation means.

8. A data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprising:

a plurality of data demodulator circuits with independent timing for spread spectrum communication according to claim 7;

a timing adjustment means adjusting the timing of the outputs of a plurality of said data demodulator circuits;

an adder means for adding the outputs of said timing adjustment means; and a data decision means for deciding the transmitted data from the output of said adder means.

9. A data demodulator circuit for spread spectrum communication, demodulating data from received signal which is spread spectrum modulated with respect to the in-phase axis and the quadrature axis by a direct sequence technique with an in-phase axis pseudo noise code and a quadrature axis pseudo noise code, respectively, said data demodulator circuit comprising:

a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition or subtraction;

a delay means for delaying the in-phase axis received signal and the quadrature axis received signal for suitable period of time;

a frequency and phase compensation means for compensating the effect of frequency and phase offset remaining in the in-phase axis received signal and the quadrature axis received signal with time delayed by said delay means, by use of the phase difference information obtained by said phase difference information extraction means;

a level detection means for detecting the levels of the phase difference information extracted by said phase difference information extraction means;

a selective interference amount calculation means for calculating the amounts of interference effecting on the outputs of said frequency and phase compensation means due to pilot signals with different timing, controlling the results of said calculation in response to the levels detected by said level detection means, and selectively outputting the amounts of interference according to the results of said control; and a data demodulation means with canceler for demodulating transmitted data from the outputs of said frequency and phase compensation means, while subtracting the interference amounts calculated by said selective interference amount calculation means.

10. A data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprising:

a plurality of data demodulator circuits with independent timing for spread spectrum communication according to claim 9;

a timing adjustment means adjusting the timing of the outputs of a plurality of said data demodulator circuits;

an adder means for adding the outputs of said timing adjustment means; and a data decision means for deciding the transmitted data from the output of said adder means.

11. A data demodulator circuit for spread spectrum communication, demodulating data from received signal which is spread spectrum modulated with respect to the in-phase axis and the quadrature axis by a direct sequence technique with an in-phase axis pseudo noise code and a quadrature axis pseudo noise code, respectively, said data demodulator circuit comprising:

a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition and subtract;

a delay means for delaying the in-phase axis received signal and the quadrature axis received signal for suitable period of time;

a level control means for controlling the levels of the phase difference information obtained by said phase difference information extraction means;

a frequency and phase compensation means for compensating the effect of frequency and phase offset remaining in the in-phase axis received signal and the quadrature axis received signal with time delayed by said delay means, by use of the phase difference information obtained by said phase difference information extraction means;

an interference amount calculation means for calculating the amount of interference effecting on said level controlled outputs of said frequency and phase compensation means due to pilot signals with different timing; and a data demodulation means with canceler for demodulating transmitted data from the outputs of said frequency and phase compensation means, while subtracting the interference amounts calculated by said interference amount calculation means.

12. A data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprising:

a plurality of data demodulator circuits with independent timing for spread spectrum communication according to claim 11;

a timing adjustment means adjusting the timing of the outputs of a plurality of said data demodulator circuits;

a level adjustment means for adjusting the levels of said outputs of said plurality of data demodulator circuits with timing adjusted by said timing adjustment means;

an adder means for adding the outputs of said level adjustment means; and a data decision means for deciding the transmitted data by the output of said adder means.

13. A data demodulator circuit for spread spectrum communication, demodulating data from received signal which is spread spectrum modulated with respect to the in-phase axis and the quadrature axis by a direct sequence technique with an in-phase axis pseudo noise code and a quadrature axis pseudo noise code, respectively, said data demodulator circuit comprising:

a phase difference information extraction means for extracting information of phase differences, by multiplying in-phase axis received signal and quadrature axis received signal by respective pseudo noise codes used on the transmitter side, taking addition or subtraction on two of the products in a predetermined combination, and averaging the results of the addition or subtraction;

a delay means for delaying the in-phase axis received signal and the quadrature axis received signal for suitable period of time;

a level control means for controlling the levels of the phase difference information obtained by said phase difference information extraction means;

a frequency and phase compensation means for compensating the effect of frequency and phase offset remaining in the in-phase axis received signal and the quadrature axis received signal with time delayed by said delay means, by use of the phase difference information obtained by said phase difference information extraction means;

a selective interference amount calculation means for calculating the amounts of interference effecting on the outputs of said frequency and phase compensation means due to pilot signals with different timing, controlling the results of said calculation in response to the levels detected through a controlled variable calculation process by said level detection means, and selectively outputting the amounts of interference in compliance with the results of said control; and a data demodulation means with canceler for demodulating transmitted data from the outputs of said selective frequency and phase compensation means, while subtracting the interference amounts calculated by said selective interference amount calculation means.

14. A data demodulator circuit for spread spectrum communication, demodulating data from received signal which is spread spectrum modulated with respect to the in-phase axis and the quadrature axis by a direct sequence techniques with an in-phase axis pseudo noise code and a quadrature axis pseudo noise code, respectively, said data demodulator circuit comprising:

a plurality of data demodulator circuits with independent timing for spread spectrum communication according to claim 13;

a timing adjustment means adjusting the timing of the outputs of a plurality of said data demodulator circuits;

a level adjustment means for adjusting the levels of said outputs of said plurality of data demodulator circuits with timing adjusted by said timing adjustment means;

an adder means for adding the outputs of said level adjustment means; and a data decision means for deciding the transmitted data from the output of said adder means.

15. A method for data demodulation in a demodulation apparatus for spread spectrum communication which demodulates data from received signal which is spread spectrum modulated with respect to the in-phase axis and the quadrature axis by a direct sequence technique with an in-phase axis pseudo noise code and a quadrature axis pseudo noise code, respectively, said method comprising the steps of:

multiplying in-phase axis received signal and quadrature axis received signal with respective pseudo noise codes used on the transmitter side;

taking addition or subtraction on two of the products in predetermined combination;

extracting information of phase differences by averaging the results of the addition or subtraction; and compensating the effect of phase differences remaining in the in-phase axis received signal and the quadrature axis received signal by use of the phase difference information.

16. The method of data demodulation of claim 15, further comprising before the compensating step, the step of:

delaying the in-phase axis received signal and the quadrature axis received signal for a suitable period of time; and wherein the compensating step compensates the effect of frequency and phase offset remaining in the in-phase axis received signal and the quadrature axis received signal with time delayed by the quadrature axis received signal with time delayed by the delaying step, by use of the phase difference information.

17. The method of data demodulation of claim 16, further comprising before the compensating step, the step of:

controlling the levels of the phase difference information.

18. The methods of data demodulation of claim 16, further comprising the steps of:

calculating the amounts of interference effecting on the frequency and phase compensation due to pilot signals with different timing; and demodulating transmitted data by subtracting the interference amounts.

19. The method of data demodulation of claim 18, further comprising before the calculating step, the step of:

detecting the levels of the phase difference information;

selecting the amounts of interference according to the levels of the phase difference information.

20. The method of data demodulation of claim 18, further comprising before the compensating step, the step of:

controlling the levels of the phase difference information.

21. The method of data demodulation of claim 20, further comprising before the demodulating step, the step of:

selecting the amounts of interference according to the levels of the phase difference information.

22. The method of data demodulation of claim 15, further comprising the steps of:

adjusting the timing of outputs of a plurality of the demodulation apparatus;

adding the outputs of a plurality of the demodulation apparatus; and deciding the transmitted data.

* * * * *